United States Patent

[11] 3,614,521

[72] Inventor Erich E. Brueschke
 Homewood, Ill.
[21] Appl. No. 880,881
[22] Filed Nov. 28, 1969
[45] Patented Oct. 19, 1971
[73] Assignee The United States of America as represented by the Secretary of the Air Force

[54] MULTICHANNEL MULTIPLEXED QUASI THREE-DIMENSIONAL DISPLAY SYSTEM
 6 Claims, 40 Drawing Figs.

[52] U.S. Cl. ........................................ 315/22,
 315/18, 178/6
[51] Int. Cl. ........................................ H01j 29/70
[50] Field of Search ........................................ 315/18, 22;
 178/6.8, DIG. 23

[56] References Cited
 UNITED STATES PATENTS
 3,404,309 10/1968 Hassell et al. .................. 315/18
 3,473,079 10/1969 Adornetto et al. ............. 315/22
 3,315,120 4/1967 Yanishrvsky .................. 315/22

3,440,342 4/1969 Beltrami .................... 178/DIG. 23

Primary Examiner—Rodney D. Bennett, Jr.
Assistant Examiner—N. Moskowitz
Attorneys—Harry A. Herbert, Jr. and Robert Kern Duncan ABSTRACT: Analog signals on a plurality of channels are processed through electronic ultrafast multiplexing and timing control circuits to present control signals to the X, Y, and Z inputs of a conventional single-beam oscilloscope for providing a skewed display of the presentation of the plurality of channels on the oscilloscope. This results in a quasi three-dimensional representation of the signals. The analog signals on each channel are characteristically instantaneously one-dimensional in signal amplitude; each channel is then displaced in a skewed relationship and supplies in pseudodepth the second dimension such as frequency, (in some applications the second dimension may be position); time then being the third dimension in which the channel information is presented. The skewing of the channel presentation coupled with intensity modulation of the individual channels proportional to each individual channel signal amplitude creates the three-dimensional effect on the two-dimensional face of the oscilloscope.

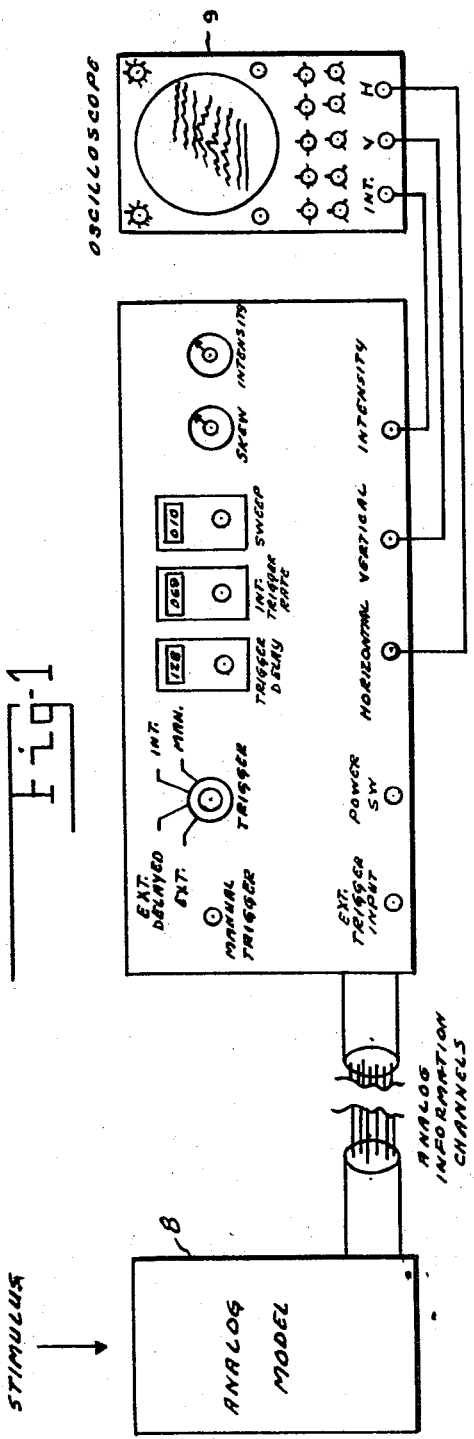

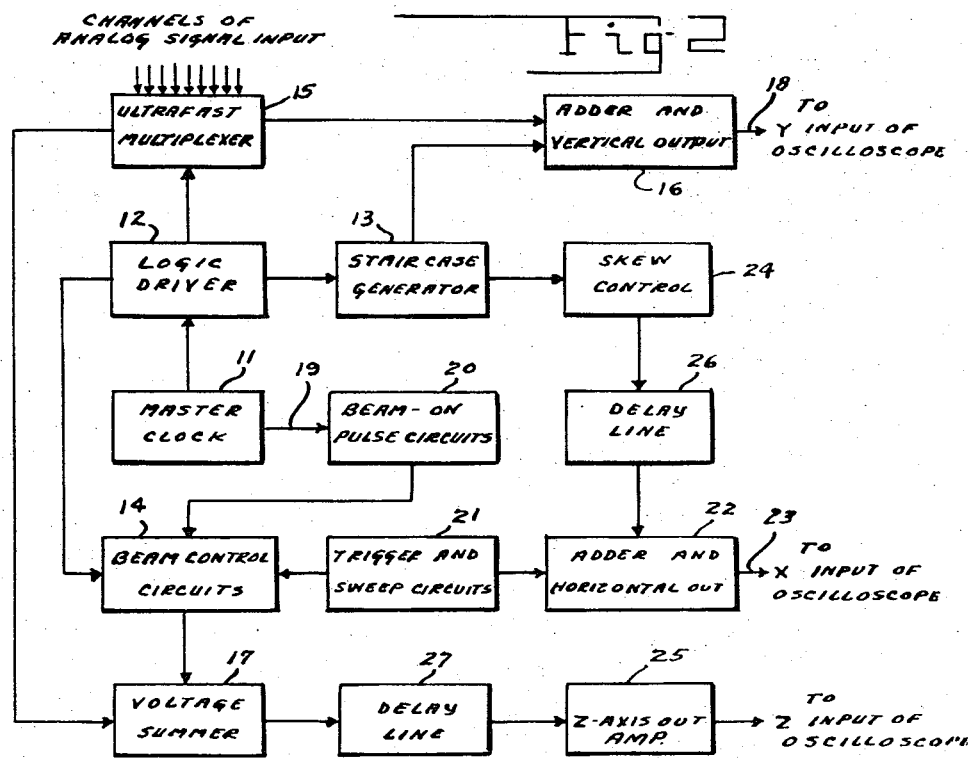
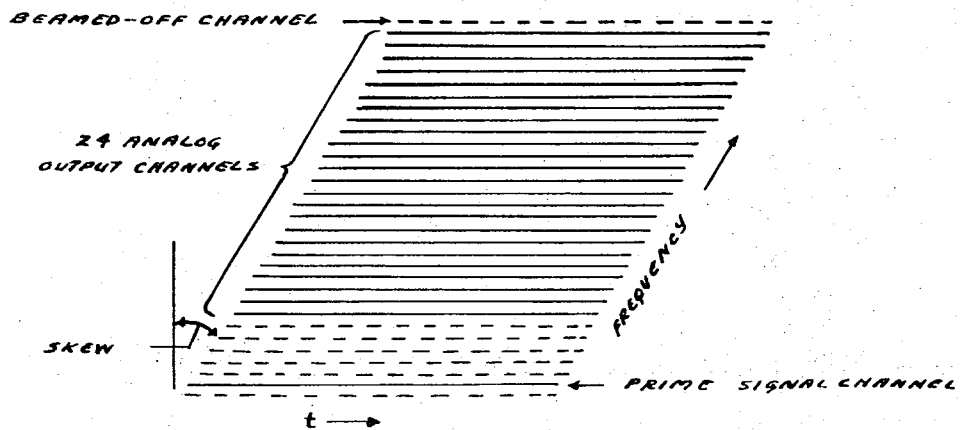

Fig-3
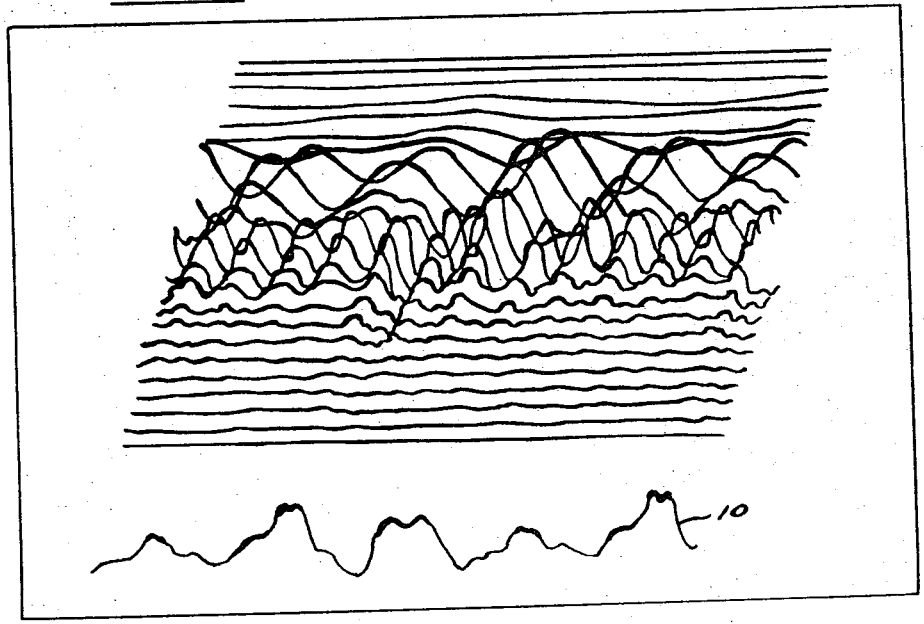
Fig-9
Fig-6
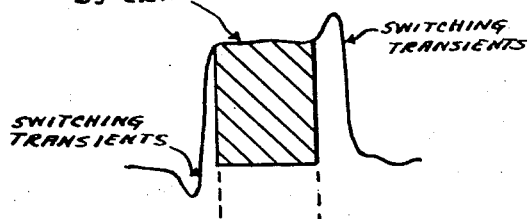
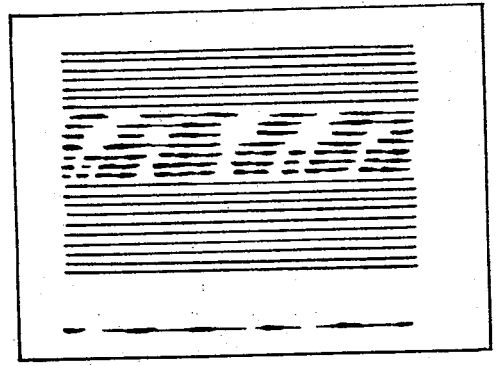
INVENTOR
ERICH E. BRUESCHKE
BY Henry A. Herbert Jr.
Robert Kern Duncan and
ATTORNEYS

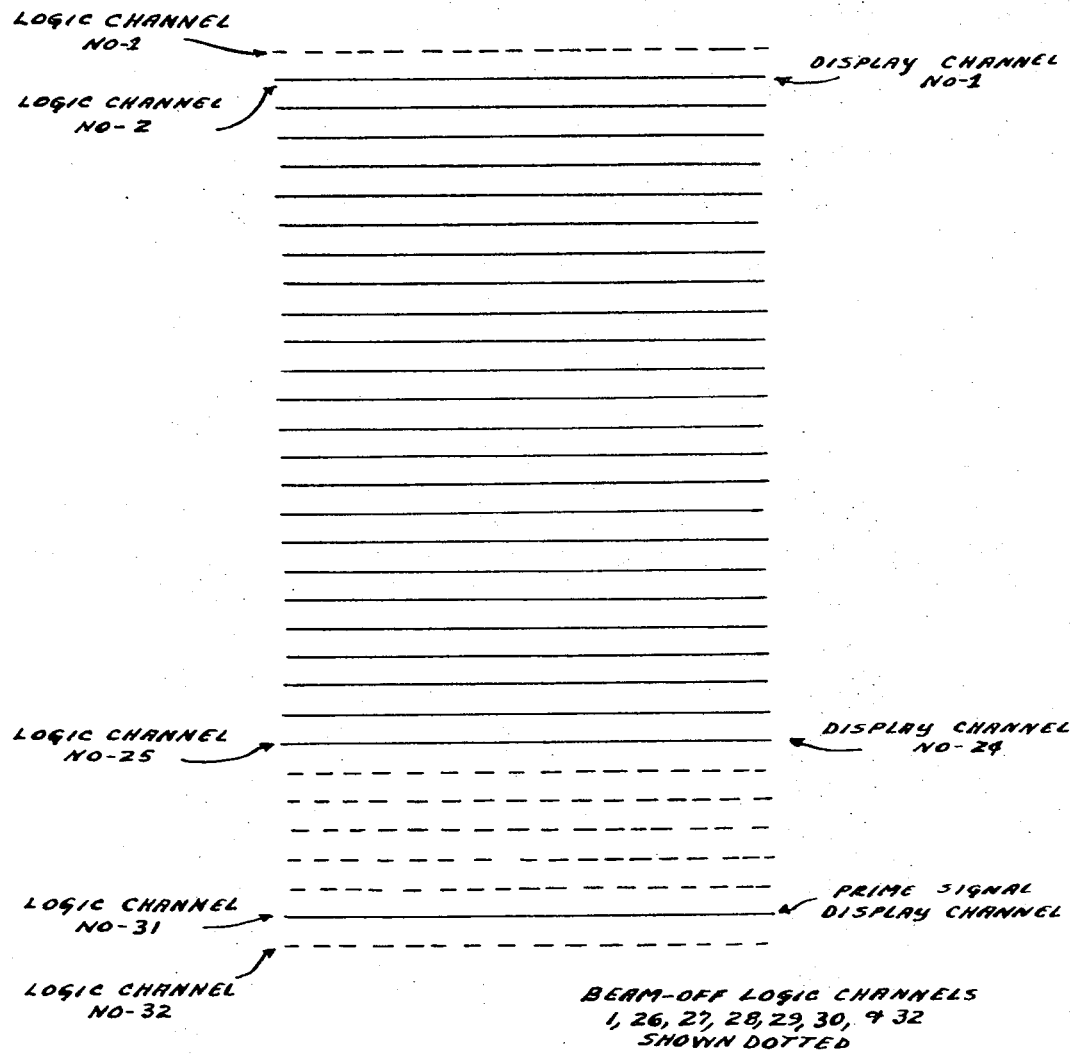

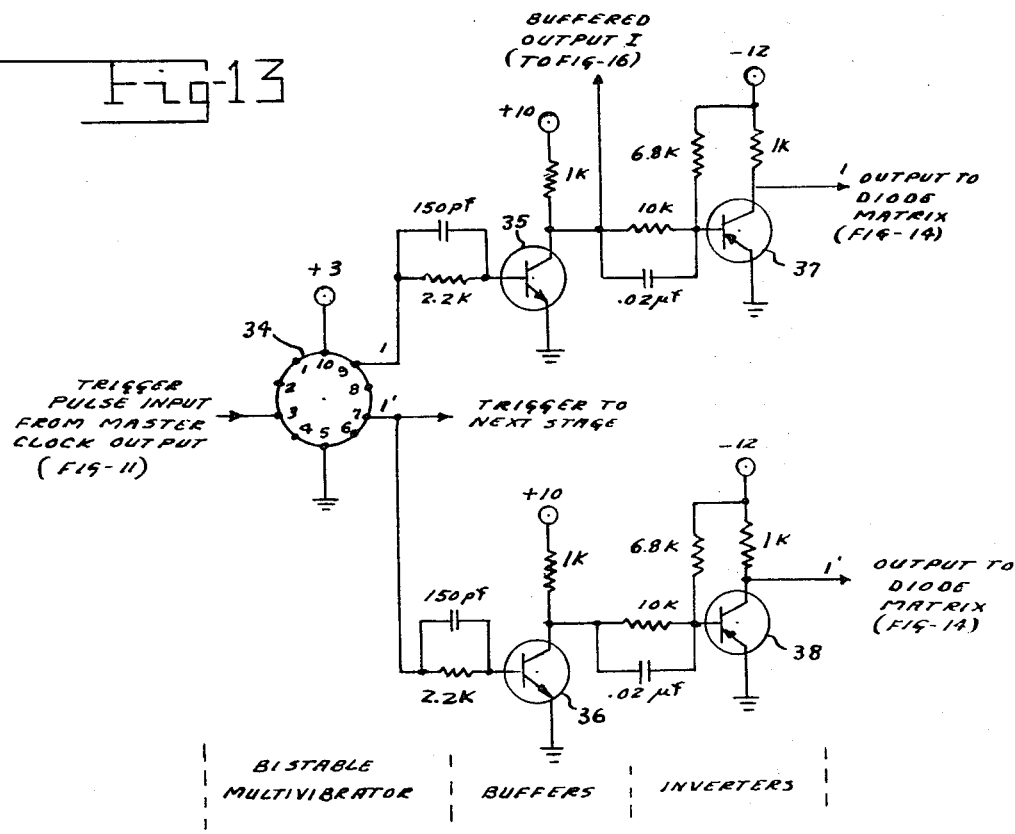
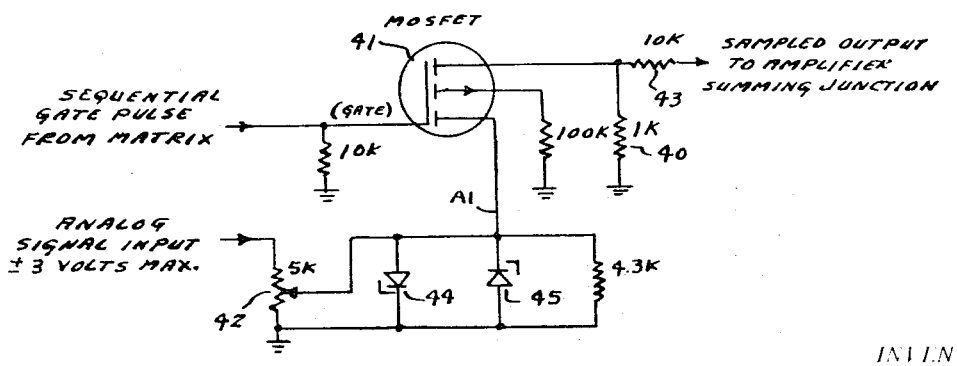

INVENTOR.
ERICH E. BRUESCHKE

BY Nancy A. Herbert Jr.
Robert Dan Duncan
ATTORNEYS

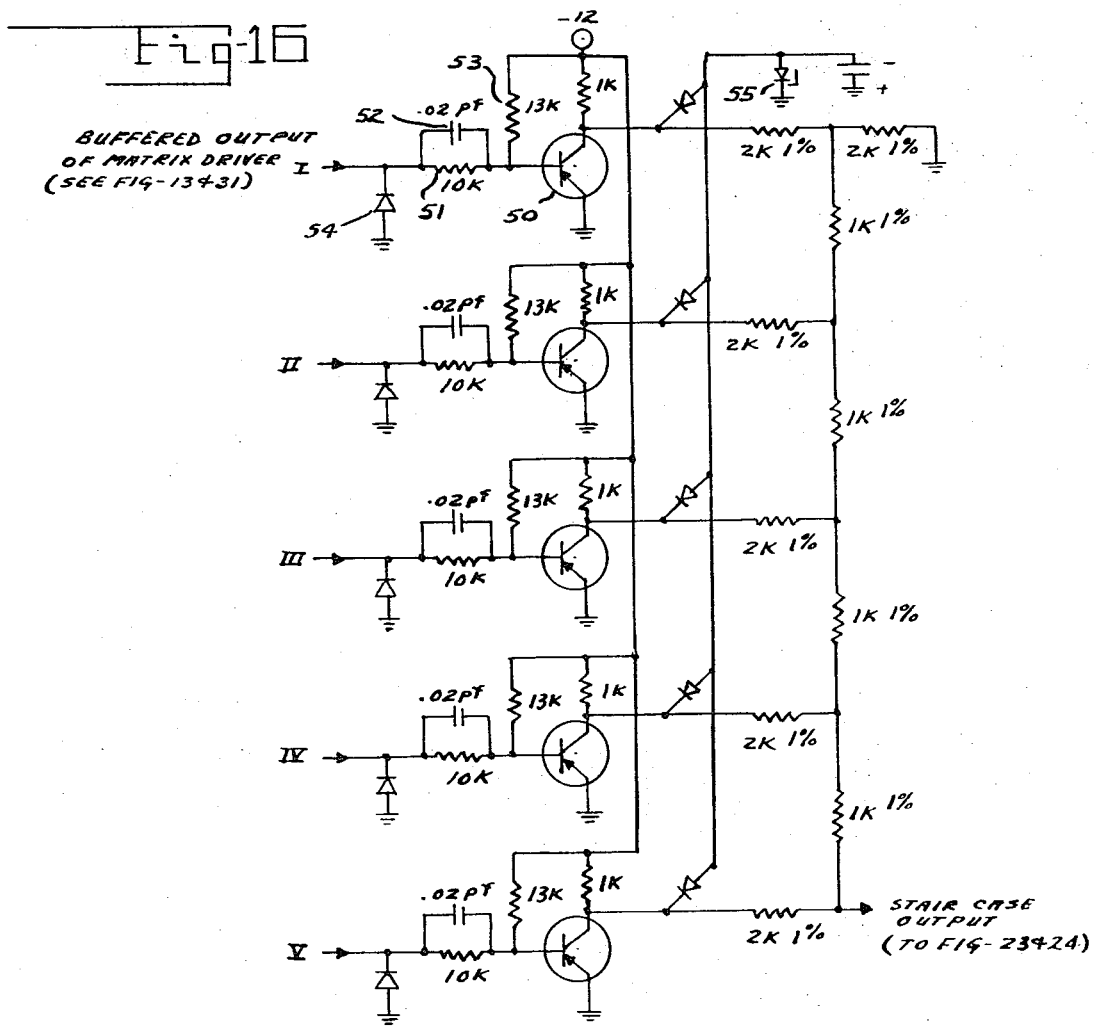
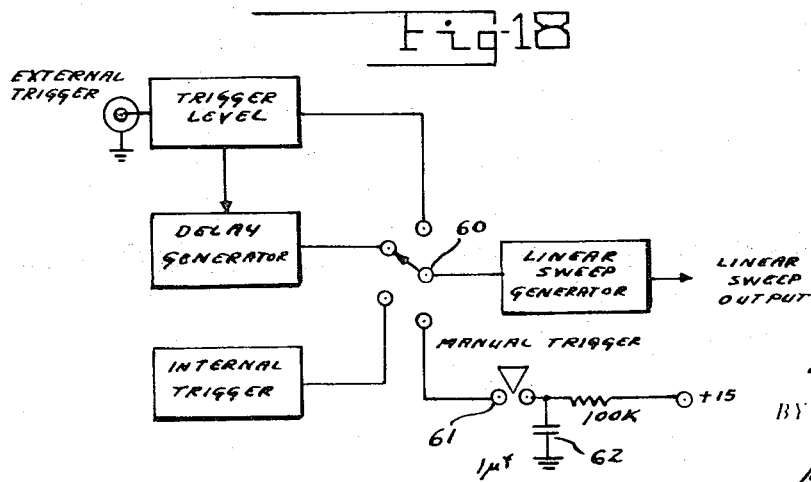

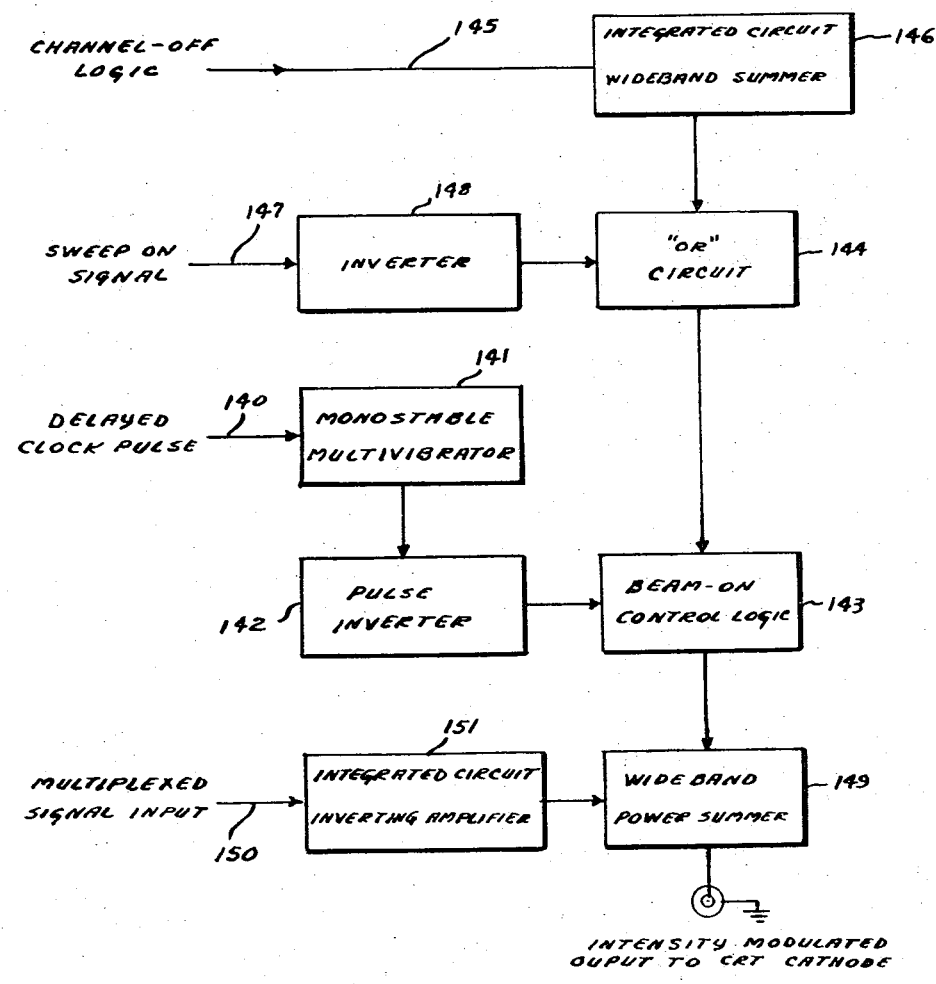

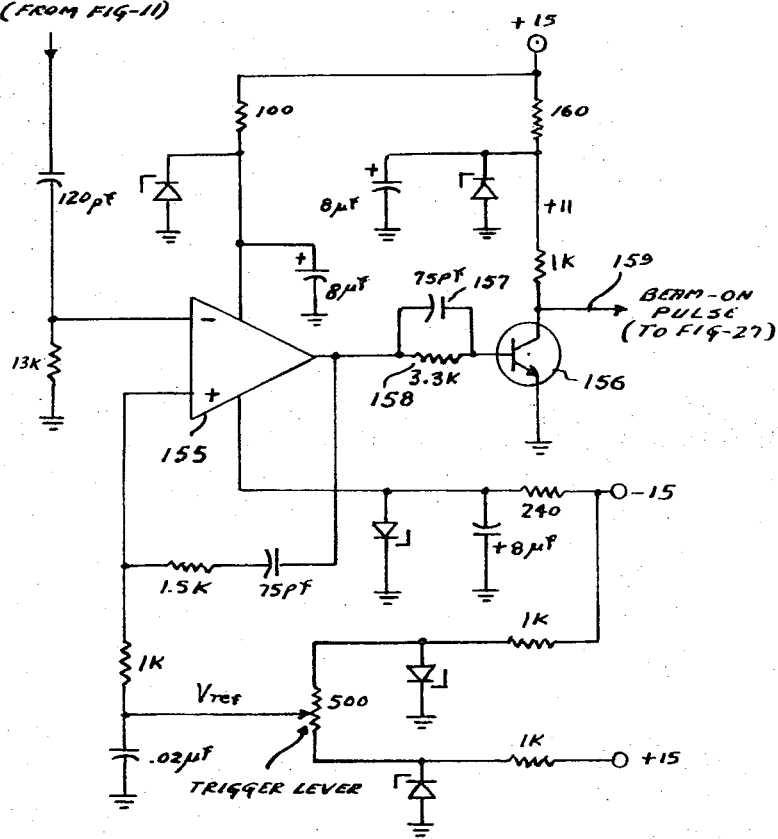

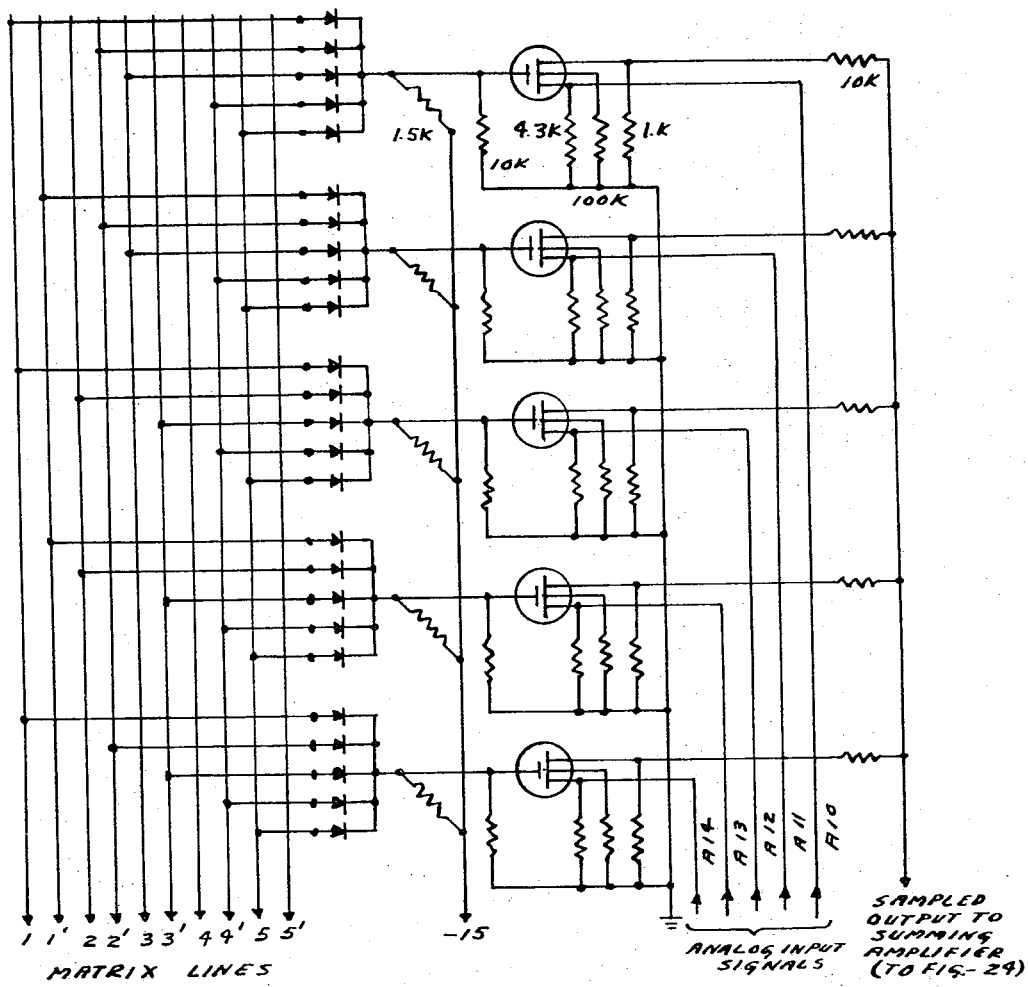

3,614,521

MULTICHANNEL MULTIPLEXED QUASI THREE-DIMENSIONAL DISPLAY SYSTEM

BACKGROUND OF THE INVENTION

The field of this invention is in signal display circuitry for multichannel presentation on single-beam oscilloscopes.

Many prior art devices for multiple information displays on single-beam oscilloscopes are well known. The time sharing of the single-beam of an oscilloscope by two signals through relatively high-speed mechanical switching, and electronic switching, has been used for many years. It is the apparatus comprising high-speed electronic switching, channel skewing, and channel intensity modulation, cooperating for the preparation of many channels of analog signal information for presentation in three-dimensional form by a conventional single-beam oscilloscope that is the essence of this invention.

SUMMARY OF THE INVENTION

An electronic circuit is disclosed for uniquely displaying in real time a quasi three-dimensional presentation on a conventional single-beam oscilloscope a plurality of channelized analog signals. The device will display on an oscilloscope the relationships of many parameters independently varying over a period of time. It is particularly suited for analytical and diagnostic evaluations. For example, in biomedical studies the responses of an analog model of an ear, or an eye, to various stimulii, either constant or changing, may readily be observed. The analog model of the human organ has a plurality of sensors each responsive to a relatively narrow band of frequencies. Each sensor thus provides a signal channel representative of the response of that sensor. The plurality of channel responses then represents the complete response of the analog model to a particular stimulus. By observing the quasi three-dimensional display a person can obtain a picture representation, in real time, of the complete response of the analog device. Another example of the use of this invention is the presentation of the outputs of a plurality of strain gages in three-dimensional form to portray the special effects along a member as various forces are applied.

BRIEF DESCRIPTION OF THE DRAWINGS

FIG. 1 is a pictorial diagram showing how the apparatus of the invention cooperates with a channelized analog signal generator, such as an artificial ear, and a conventional single-beam oscilloscope;

FIG. 2 is a simplified block diagram of the invention;

FIG. 3 is a drawing made from an oscilloscope image showing a picture response of an analog ear to a certain sound stimulus;

FIG. 4a and FIG. 4b show the effect of channel skewing on perceived vertical component ambiguity;

FIG. 6 shows how the switching transients are suppressed by the use of beam-on control;

FIG. 7 illustrates the basic format for the display of 24 channels of output of an electronic analog device;

FIG. 8 illustrates the relationships of the logic channels, the beamed-off channels and the display channels;

FIG. 9 is a drawing made from an oscilloscope image of essentially the same signals as in FIG. 3 except with only intensity modulation and channel displacement of the beam; i.e., without any vertical signal, and without skewing;

FIG. 13 is a schematic diagram of the basic diode matrix driver circuitry;

FIG. 15 is a schematic diagram of the sampling switching using a MOSFET, one sampling switch circuit is required for each analog signal input channel in the display;

FIG. 16 is a schematic circuit of a staircase generator;

FIG. 18 is a simplified block diagram of the trigger and sweep circuits;

FIG. 25 is a block diagram of the intensity modulation circuit;

FIG. 26 is a schematic diagram of the beam-on pulse generator;

FIGS. 32a, 32b, 32c, 32d and 32e show collectively a complete schematic circuit of the ultra high-speed sampling switches and matrix lines;

DESCRIPTION OF THE PREFERRED EMBODIMENT

Figure 5:
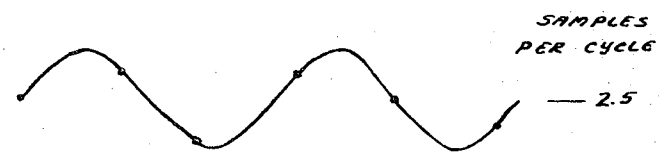
FIG. 5 shows the visual continuity of a sine wave for various sampling rates.

To effectively conduct research on analysis of complex signals, a means of simultaneous quasi three-dimensional display of amplitude and time in real time with virtually no processing delay is required. No instrument previously existed which could produce a display of up to 30 channels of analog information, each of which could contain frequency components up to 10,000 Hz. A further requirement of the display is the ability to faithfully produce single even transients (in all 30 channels) as short as 10 msec.

The invention described herein makes it possible to display 30 channels of real time analog signals. A display technique is disclosed which will produce a quasi three-dimensional effect to aid in visual analysis of signal patterns. Single transient events as short as 10 msec. can be displayed and photographed without resorting to multiple pass signals or to storage techniques. The quasi three-dimensional appearance of the display is achieved using display skew and intensity modulation of the individual channels proportional to each individual channel signal amplitude.

For versatility, the 30-channel display is compatible with the conventional typical single-beam laboratory oscilloscope. All control and synchronizing signals are generated within the display circuitry and the oscilloscope utilized serves merely as a display device.

Thirty channels of analog signal data coupled with the frequency, skew and intensity modulation requirements make a sophisticated multiplexing scheme necessary. Basic to the multiplexing scheme is a novel signal-commutating circuit.

Mechanical commutators are several orders of magnitude too slow to display the signals in real time. Electronic commutators with sampling rates up to 100,000 samples-per-second are not uncommon. A solid-state electronic commutator which can be externally driven up to 200,000 samples-per-second is commercially available. This is still over one magnitude too slow for this real time display.

To meet the stringent switching-time requirements, an ultrafast signal-sampling switch system has been incorporated in this invention. This invention can be used wherever a multiplicity of analog signals are to be displayed, analyzed, or correlated. In addition to the primary use for which this invention was conceived, i.e., the display of the multichannel responses of models of the human anatomy, such as the ear, it has been found to have many additional biomedical applications, for example, the signals from many electrocardiograms, blood pressure sensors, temperature sensors and other biomedical transducers can be displayed together, and the changes in each correlated with a change in the stimulus effected on the subject. Likewise, the responses of many subjects may simultaneously be observed with respect to a change in an environmental condition.

The quasi three-dimensional display of this invention is effected because, as it is well known, optical illusions reveal that what we perceive does not directly correspond to reality. Perception is actually a subtle blend of the visual information received from the external world and the lessons of our experience. Visual space perception is possible because three-dimensional space information from the external world is able to pass via the retina into the cortical region of the brain. Horizontal and vertical dimensions are perceived mainly because of the retinal relationship that exists; (it is to be noted that essentially the retina is only two-dimensional). The third dimension of space, depth, is perceived indirectly through a system of visual cues.

The invention and how it cooperates with conventional sensors and an oscilloscope is shown in FIG. 1. The analog model 8 may typically be that of a human (animal) ear. The oscilloscope 9 may be any conventional laboratory oscilloscope having X, Y, and Z (horizontal, vertical, and intensity) inputs, with bandwidth responses of at least to 10 MHz., and a rise time of not greater than 50 nsec. Most modern oscilloscopes satisfy these criteria. Older oscilloscopes may have insufficient bandwidth and prohibitively long rise times.

A simplified block diagram of the invention is shown in FIG. 2, and FIG. 3 shows a sketch made from the display provided on the face of an oscilloscope by this invention of the response of a 24-channel analog ear model. In addition to the 24 channels of individual sensor response of the model, a prime signal channel is displayed (the bottom trace, 10) which in this illustrated example, was the original unprocessed speech waveform providing the stimulus to the ear model.

The preferred embodiment of this invention herein described has capabilities for 30 display channels. In the particular use application of the invention shown, 24 channels are used for individual information display, one channel displays the prime signal (stimulus), and seven channels are beamed-off logic channels as will be further explained. Using the techniques as disclosed herein the apparatus may readily be modified for a greater or lesser number of channels. The teaching herein will also enable those skilled in the art to modify the apparatus as required for channels having different response characteristics, and to provide appropriate display characteristics such as shown in FIG. 9, which is a presentation of essentially the same signals as shown in FIG. 3 except the skew control is turned down to provide no skew and the vertical signal amplitude is switched off the summing amplifier providing the composite vertical output to the oscilloscope.

BASIC CONSIDERATIONS OF THE INVENTION

As a very high speed display is required, it is logical to use a basic $2^n$ channel system. The closest channel number C to 30 is 32 or $2^5$. Therefore a basic modulo 32 counter logic multiplexing control can be used which is reliable and straightforward in design. Use of a 32 time-division approach allows the first and last channels to be deleted using a gated channel-off technique. These channels contain transients in the vertical signal stages due to slewing rate limitations in currently available operational amplifiers. At the present time this maximum slewing rate is approximately 20 volts per microsecond. Vertical channel positioning results in a high-slew condition when returning to channel 1 following display of channel 32. Slew-rate limitations and settling-time limitations make it advisable to beam off the first and last channels to assure accurate vertical channel positioning.

Two visual cues, in addition to uniform vertical signal-channel spacing, are used to give the 30-channel display a seemingly (quasi) three-dimensional appearance. The first, which is a displacement cue, is display rotation or skew. The second, which is a nondisplacement cue, is individual channel intensity modulation.

The analog signal channels contain frequency components up to 10,000 Hz. The sampling rate is equal to the product of the maximum frequency component $f_m$, the number of channels (32 for this purpose), and the samples-per-cycle at the highest frequency $f_m$.

Several factors must be considered in determining the required samples-per-cycle of the system. These are the minimum theoretical sampling rate required, the actual sampling rate required to give visual signal continuity (a somewhat arbitrary definition), and the rate required to give an acceptable maximum error in plotting the signal amplitude. The sampling rate must also be fast enough to prevent significant aliasing of any sampled signal up to the maximum frequency $f_m$.

It is well known that any complex waveform can, by Fourier analysis, be represented by the sum of a series of sinusoidal signals. Therefore any sampling technique capable of accurately portraying the highest frequency component present in the original signal can faithfully portray the original complex waveform.

Classical information theory states that a band-limited signal (a signal with no spectral components beyond a certain frequency $f_m$) is uniquely specified if sampled at intervals of $2f_m$ samples-per-second (the Nyquist rate). It can be shown that the complete signal can be reconstructed from the knowledge of the signal at the sampled instants if the signal is band limited and is passed through an ideal low-pass filter.

An ideal low-pass filter will have an impulse response for negative values of time $t$. This holds even though the driving force was not applied until $t=0$. It is intuitively known that a physically real system cannot have a response before the driving function is applied. This is known as the "causality condition." A system whose magnitude function violates the Paley-Wiener criterion for physically reliable systems has a noncausal impulse response. It follows that ideal filters are noncausal and therefore are not physically realizable. It has also been shown that a signal which exists only over a finite time interval cannot be band limited. Practical signals are not band limited nor are ideal filters realizable. Many signals approximate band-limited signals and it is possible to design short cut off low-pass filters (although they may have a large number of sections). The solution to these practical problems is to sample the signal at a rate in excess of the Nyquist rate. For comparison purposes a theoretical system, sampled at the Nyquist rate, would require a minimal sampling rate $R_m$ as shown:

$$R_m > R_n \times C \times f_m$$
$$R_m > 2 \times 32 \times 10,000$$
$$R_m > 640,000 \text{ samples second.}$$

Where $C$ is the number of signal channels and $R_n$ is the Nyquist rate.

A signal sampled at the Nyquist rate ($2f_m$) can only be validly reconstructed if the sampling is optimally coded. If in sampling a sine wave the sampling is timed to occur only at the peak value, the sine wave is optimally defined and can be reconstructed with the information from only these sampled points, assuming there is no error in amplitude measurement. Samples taken at any other point will define only the frequency and not the amplitude or the phase. Samples taken at the zero crossings provide no amplitude information and this is the worst coding condition. In practical systems employing low-pass filters, sampling is usually done at four or five times the maximum input frequency in order to reduce the effects of these coding errors.

The signal-reconstructing properties of low-pass filters cannot be used with the system disclosed herein because the individual channel signals are not decommutated. They are separated on the CRT face only by virtue of their time relationships.

For a sine wave sampled five times each cycle and with linear interpolation between the sampling points, the average error in reproducing the peak amplitude is 11 percent. In applications where precision is required, the approximate sampling rate error resulting from linear interpolation between samples is:

$$e_r = \pi^2/2(f_d/f_s^2)$$

where $e_r$ = sampling rate error
$f_d$ = data frequency
$f_s$ = sampling frequency in samples-per-second.

A 10-sample-per-cycle system would then give a maximum amplitude error of 5 percent if only linear interpretation were used. This maximum error can be greatly reduced by visual interpolation.

The remaining consideration is the number of samples required to give good visual signal continuity. Referring to FIG. 5 it is obvious that two and one-half samples-per-second is much too slow for good visual continuity. Somewhere between 6 and 9 samples per cycle appear to be adequate but 10 are used to be conservative. With the assumption that all 32 channels are to be sampled at 10 samples-per-cycle of $f_m$, the sampling rate, $R$, is then $$R = R_s \times C \times f_m$$

$R = 10 \times 32 \times 10^4 3.2$ million samples-per-second.

From this we can calculate the maximum time available to sample any given channel $t_s$:

$$t_s = 1/R = 10^{16}/3.2 = 310 \times 10^{19} \text{ sec.} = 310 \text{ nsec.}$$

The product of this signal-sampling system will ultimately be a two-dimensional visual display with three-dimensional visual cues provided by display skew and intensity modulation of individual channels.

By introducing a fraction of the instantaneous vertical channel-positioning signal into the horizontal sweep signal the resulting display is given a new perspective. This technique, skew, enhances the quasi three-dimensional effect and also reduces ambiguities due to signal channel overlap.

Skew is effective in reduction or elimination of ambiguity in the display due to overlap of the vertical component of the signal. An illustrative example of the need for skew is shown in FIG. 4a. Five idealized square waves are shown with uniform channel separation. Without skew one cannot be certain which horizontal signal component goes with which vertical component. This is because the vertical components have been made ambiguous by overlap. As shown in FIG. 4b, skew makes it obvious that the signals are identical square pulses. A variable skew, from 0° to 30° to the vertical, has been found to be sufficient to prevent most vertical signal ambiguity and to provide an adequate display rotation visual cue.

In a system of two to five input channels, sufficient vertical display space is available to assign each channel an operating domain. In a large multiple-channel system the channels are spaced rather closely and no definitive space domain can be assigned. Thus appreciable signal excursion of a given channel may cause it to cross an adjacent channel or even several channels.

When channels cross on the display there is the possibility of crossover ambiguity. This is a particular problem when the two channels contain information which is somewhat similar.

Crossover ambiguity can be greatly reduced by making the beam intensity of a given analog signal channel proportional to the absolute displacement from its zero-signal position. Positive-going signals (upward displacement of the beam) produce increases in channel beam intensity and negative-going signals produce decreases in beam intensity. The zero-signal condition is represented as a straight line at a vertical displacement appropriate for the given channel and at a medium intensity. A little reflection on this will reveal that any two or more channels will always cross each other at slightly different (but still discernable) intensities. Intensity modulation of the individual channels also provides an additional three-dimensional visual cue.

The 30-channel display is to function with most single-beam laboratory oscilloscopes which have independent X and Y input amplifiers. Because the introduction of skew requires a rather sophisticated modification of the horizontal sweep signal, the oscilloscope must be externally driven in the X axis and therefore its own internal sweep generator cannot be used. The usual triggering modes (internal and delayed) are provided by the invention along with a calibrated horizontal time base generator.

A horizontal linear time base of 5 msec. to several seconds is appropriate for most multichannel signals with no frequency components in excess of 10 kHz. An internal trigger mode is required so that signals can be continuously scanned in real time. A manual trigger mode is useful for many types of single-event transients and is provided.

An external trigger and level control are required to permit triggering on a ±10-volt signal. Typical triggering sources are external timing pulses, analog signal channel inputs, onset of stimulus signals, and others. A trigger delay of 1 msec. to 1 sec. is required in order to display any given portion of a recorded repetitive or real time repetitive signal.

The capability to photograph the display is provided. It has been possible to photograph the entire 30-channel display for single-event signals as short as 10 msec.

SYSTEM CONSIDERATIONS OF THE INVENTION

The systems problem was to develop a technique to display the information from 30 unique signal channels using a single-beam oscilloscope in essentially real time. Further the intensity of the beam was to be proportional to the instantaneous signal amplitude (signal channel intensity modulation) of the channel being sampled at any instant. The electron beam of the cathode-ray tube (CRT) must be instantaneously positioned so that only a given channel will occupy a given vertical position and will vary plus and minus about that channel position. No ambiguities were to be present which would prevent interlacing or overlap of the beam of two or more channels. Skew of the display from 0° to 30° was required.

The nature of the system requirements and the desirability that the display use a single-beam oscilloscope (for versatility and economy) precluded virtually all systems except an advanced form of a time-division-multiplexed display.

A time-division multiplexer is a device which accomplishes the sampling of a large number of signal inputs in time division and presents at its output a pulse train which represents the instantaneous sampled amplitudes of all the inputs in a periodic time sequence. The multiplexer utilizes a commutator to sample the signals in sequence. The sampled signals are added or interlaced on a single signal channel (but are still separated in time).

Multiplexing is a dual process whereby many independent channels of analog information are sampled in sequence (using a commutator) and then combined on a noninterfering basis (multiplexed) into a common composite channel.

For example two independent signals $f_1(t)$ and $f_2(t)$ may be alternately sampled by a commutator for a short period and then added. The signals are thus mixed but are uniquely separated in time. They could be separated again by a second switch which is synchronized with the first, resulting in a decommutation process. For the purposes of this invention no decommutation is used. Rather, the signals are separated by the display itself using a synchronous CRT beam-switching technique. This is accomplished by making the CRT beam-control pulses slaved to the same master logic which also controls the beam position circuits and the signal sampling switches.

It should be noted that the terms "multiplexing" and "commutation" are often frequently interchanged in signal-processing and telemetry work. The term "commutation" is usually used to identify a form of signal sampling where multiple channels of continuous analog input information are sampled in sequence. The actual device (electronic or mechanical) used to perform the sequential sampling is termed a "commutator." The sampled data are then mixed (or multiplexed) so that the data can be transmitted or processed as a single channel.

In general time-division multiplexing (also frequently termed pulse-amplitude-modulation) consists of a sequencing circuit and a signal-sampling circuit (sampling switch). The sequencing circuit generates a series of control pulses (gate pulses) which cause the appropriate sampling switches to close (conduct) at particular times. Typically this circuit consists of a master clock followed by a binary frequency divider and logic matrix. The most important component of the multiplexer is the sampling switch. It has previously been stated that in order to meet the system requirements the actual channel on-time of the embodiment being described cannot exceed 310 nsec.

An ideal sampling switch would present an infinite impedance between the signal channel and the load when in the off state and would present a zero impedance when in the on state. Further, its switching speed would be infinite and no induced switching transients would be present. By contrast the real sampling switch will have a finite off-state impedance, a nonzero on-state impedance, a measurable leakage to ground, and a finite switching speed. In addition offset voltages, noise voltages, and induced transients in the load (due to the switch turn-on signal) are often present.

There are two general classes of real sampling switches, namely mechanical switches and electronic switches. Mechanical switches have many nearly ideal characteristics but because of their limited sampling rate they are not suitable for this device.

Fundamentally all solid-state signal-sampling switches (or gates) involve the undesirable superposition of signal voltages and voltages resulting from the gate control signal. Numerous techniques exist for balancing nonsignal potentials produced by the gating action. The principal objective is to cause each gate to act as a low resistance when conducting (on-state) and have a very high resistance when not conducting (off-state).

Common solid-state signal gates are the balanced-diode gate, the transformer-coupled balanced transistor gate, the diode bridge gate, and the direct-coupled dual transistor gate. The gates are either in series, shunt, or series-shunt with the signal voltage.

A recent form of solid-state gate is the field-effect-transistor (FET) gate. Because of its unique structure, this transistor type offers certain desirable characteristics. These include low or zero offset voltages, very low back current and simple gate control circuitry. Because there is no direct connection between the gate and the transistor substrate (also called transistor bulk) the metal-oxide form of the FET, commonly called the MOSFET, is especially suited for use in signal sampling applications and is the one that has been found to be greatly preferred in this invention.

Common display systems, such as the familiar television receiver, use synchronized horizontal and vertical oscillators to produce a two-dimensional display. This requires the development of some rather sophisticated synchronization pulses and synchronization techniques.

All beam synchronization problems can be eliminated by generating X, Y, and Z driving signals for the CRT directly in the display system electronics of this invention. The result is that the oscilloscope used becomes merely a simple display device.

Numerous transients are produced in the display system circuitry. The most significant sources of these transients are sampling switch transients and transients due to time delays in the system control logic. Additional transients are produced when composite signals are utilized to produce display skew and to produce individual channel intensity modulation. In order to prevent display artifacts and loss of display resolution, these transients must not be displayed by the CRT.

A simple, direct technique for transient suppression is to turn on the CRT electron beam only during transient-free time periods. The time available to sample one signal channel for this embodiment has been shown to be approximately 300 nsec. Switching transients of 50 to 75 nsec. duration occur at sampling switch turn-on and turnoff times with an intervenient stable period consisting of the actual instantaneous signal channel input.

As is illustrated in FIG. 6, a properly synchronized CRT beam-on pulse will result in display of only the actual signal voltage. The negative CRT cathode beam-on pulse is slaved to the same basic master clock rate that is used to drive all system logic. As a result, it is possible to beam on the CRT at an optimum time in each channel such that transients are suppressed. The development of sophisticated beam-on control circuitry has been basic to the successful development of the entire display system.

Aperture time is an important consideration in systems using signal-sampling techniques. In digital systems, if the signal-sampling time (aperture time) is not short with respect to the period T of the highest frequency component, $f_m$, an encoding error results.

For this display system, the change in signal amplitude during sampling is of interest only when the signal is actually being displayed. This actual display time is termed aperture time. The effect introduced by the use of a finite rather than an instantaneous sample aperture in the commutation process is commonly called the "aperture effect." For this display system the aperture effect will be manifest by finite movement of the electron beam during the beam-on condition. This movement will result in widening of the spot of light displayed on the CRT. However, because this spot of light is also being moved horizontally by the horizontal sweep signal (which has the effect of tracing out a very small segment of the waveform) no loss of display resolution takes place. Because skew merely adds an instantaneous component of the vertical channel-positioning signal to the horizontal signal, it is independent of aperture time.

The true aperture time is in effect the actual beam-on time of the CRT (about 150 nsec.). For some systems a nearly zero aperture time would be ideal. This is not the case for this system as an aperture time << 100 nsec. would result in a low-energy beam on pulse (due to its very short duration at the CRT cathode). The display would then be too dim to visualize or to photograph when using high horizontal sweep rates. An aperture time of about 150 nsec. is consistent with the sampling rate used and with the switching transient suppression method which utilizes beam-on control techniques.

The basic element parameters of the invention have now been described and the approach to the system itself will be explained. FIG. 2 is a simplified functional block diagram of the display system. It was mentioned earlier but will now be described in detail.

The master clock 11 produces 3.2 million pulses-per-second which are used to synchronously drive all logic and beam-on circuitry. The logic driver 12 has a five-stage integrated circuit binary counter in the ripple-carry configuration. The 10 logical outputs of the counter are shaped, processed and used to drive a diode logic matrix also contained in the logic driver block. Outputs from the logic driver are also used to drive a staircase generator circuit (ladder type) 13 to produce vertical channel position signals. The diode logic matrix produces 32 sequential output pulses. Selected output pulses go to the beam control circuits 14 where they control which channels will be in the off-channel state. The remaining sequential pulses from the logic driver go to the ultrafast multiplexer 15.

The ultrafast multiplexer contains the MOSFET sampling switches which are gated on by the pulses from the logic driver. An integrated circuit summer, contained in the ultrafast multiplexer block, adds and inverts the sampled analog input signals. This composite signal (which is time-division multiplexed) is sent to two other circuits. First it is sent to the adder and vertical output circuits 16 where it will be ultimately used to produce the individual channel amplitude (position) changes on the CRT display. Second the composite signal is sent to the voltage summer 17 of the Z-axis output circuits where it will be involved in intensity modulation of individual channels.

The vertical output 18 is an instantaneous sum of the instantaneous staircase amplitude and the level of the individual signal channel being sampled at the given instant. All vertical beam-positioning information and also all undesirable transients are present in this signal. All these signals would participate in positioning the CRT electron-beam vertically except for the action of the beam-on control scheme prevents display of unwanted information.

Delayed trigger pulses 19 from the master clock 11 are used to trigger the beam-on pulse circuits 20. The delayed trigger pulses consist of 150 nsec. pulses synchronized to the multiplexer sequencing rate by the master clock triggering pulses. Unwanted beam-on output pulses are disabled by the beam control circuits 14. Pulses not disabled are amplified and used to beam on the CRT.

The beam control circuits 14 accept selected logic pulses from the diode matrix. These pulses disable the beam-on pulse to produce any off-channels required by a given display format. A sweep-on signal from the trigger and sweep circuits 21 is also accepted. This is used in a logic circuit which disables a beam-on pulse except when the horizontal sweep circuits are active.

The triggering and sweep circuits 21 provide the appropriate triggered linear horizontal sweep voltages required by the display. Two separate outputs are provided. First, a sweep-on indicator signal is sent to the beam control circuits, as already noted. Second, the linear sweep voltages are sent to the adder and horizontal output 22 where they provide an output 23 to sweep the CRT beam horizontally.

The skew control circuit 24 attenuates the staircase voltage from the staircase generator. This signal is then summed with the linear sweep signal by the adder and horizontal output circuits 22 to produce display skew.

Beam-on pulses under the control of the beam control circuits 14 are summed with the composite analog data from the ultrafast multiplexer. This new composite signal is then amplified in the Z-axis output amplifier 25 and connected to the CRT cathode. As a result the CRT electron beam is turned on only at the appropriate times dictated by the display logic and it is turned on with an intensity proportional to the instantaneous signal channel amplitude (individual channel intensity modulation).

The instantaneous beam position and beam intensity are therefore controlled by the instantaneous amplitude of six signals:

| | |
|---|---|
| 1. Staircase voltage amplitude. | Vertical output signal. |
| 2. Analog signal amplitude of channel being sampled. | |
| 3. Horizontal sweep amplitude. | Horizontal output signal. |
| 4. Skew voltage component derived from staircase generator. | |
| 5. Controlled beam-on pulse. | Intensity modulation signal. |
| 6. Analog signal amplitude of channel being sampled. | |

In order to function properly it is essential that the horizontal signal, vertical signal and intensity modulation signal maintain their relative time relationships. Signal delays in either the X, Y, or Z signal channels of the display oscilloscope used will cause no particular problems if the delays in each channel are similar (no differential delays greater than 20 to 40 nsec.).

The common triggered laboratory oscilloscope incorporates a 150 to 200 nsec. delay-line in the vertical signal channel. This enables the oscilloscope to display the leading edge of fast-rising waveforms by triggering in advance of the actual display of the vertical input signal by the CRT.

This time delay cannot be tolerated as it will produce a differential time lag between the vertical input signal and the X and Z signals. Such delays result in display deterioration. Under certain conditions delay can cause the displayed signal to be intensity modulated by the succeeding channel signal. Relatively small differential delays can cause introduction of unwanted transients in the signal by causing beam-on pulses to occur at incorrect times.

Several solutions to this delay problem exist. Only X-Y display oscilloscopes (which do not contain a delay-line) could be used or the delay-line in a triggered oscilloscope could be disabled. A more versatile solution is provided by introducing conventional compensating, adjustable delay-lines in the horizontal signal and intensity modulation signal channel circuits. The block diagram shown in FIG. 2 shows the relationship of these delay-lines 26 and 27 to the remainder of the circuit. An adjustable delay of up to 200 nsec. has been found to be sufficient for all normal applications.

PREFERRED CIRCUITS OF THE EMBODIMENT

Master Clock and Associated Logic Circuitry

The master clock produces a series of positive-going pulses at 3.2 million pulses-per-second. In order to compensate for various system propagation delays, several delayed-clock outputs are provided. These delayed-pulses are spaced approximately every 77 nsec. between the master clock output pulses (which have a pulse interval of 310 nsec.).

Figure 10:
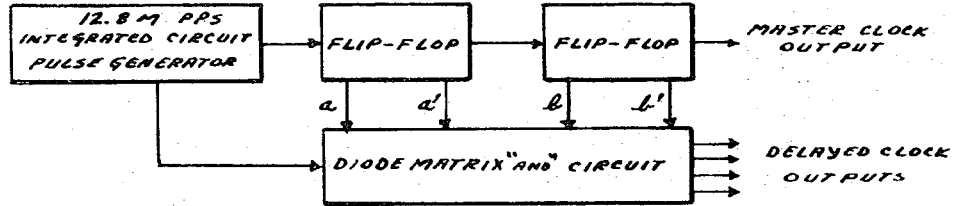
FIG. 10 is a block diagram of the master clock.

A block diagram of the master clock is shown in FIG. 10. An integrated circuit free-running multivibrator pulse generator produces relatively square (rise time less than 20 nsec.) output pulses at 12.8 MHz. Two integrated circuit flip-flop stages produce four logical outputs and also divide the pulse generator output by four to produce the basic 3.2 MHz clock rate. The logical outputs from the flip-flops and the pulse generator output are connected to a diode matrix AND circuit. Because the master clock pulse and delayed clock pulses are obtained from this AND circuit, one input of which is the 12.8 MHz pulse generator, the output pulses are narrow (about 75 nsec. duration) and are spaced every 310 nsec.

Figure 11:
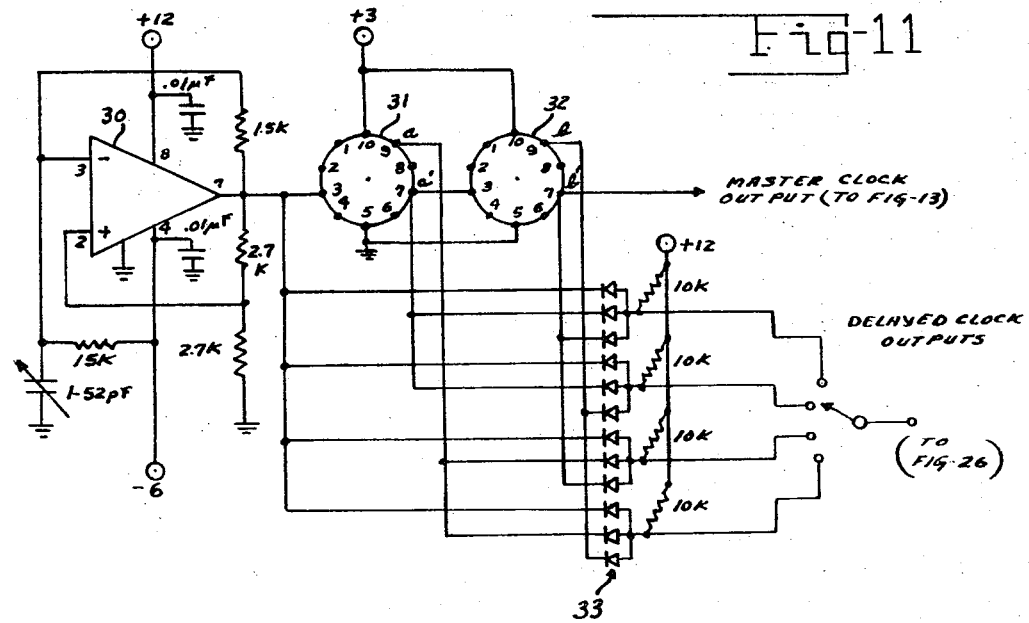
FIG. 11 is a schematic diagram of the integrated circuit master clock shown in FIG. 10.

The schematic of the integrated circuit master clock is shown in FIG. 11. A type μA710 integrated circuit free-running multivibrator 30 and types μL926 flip-flops 31 and 32 are typical examples of suitable integrated circuit components. The twelve diodes in the AND circuit 33 should have fast switching characteristics. Type FD–100 are examples of suitable diodes.

The master clock is used to trigger five integrated circuit bistable multivibrators. Each multivibrator produces logical 0 and logical 1 outputs. Each multivibrator with associated buffer and inverting circuitry comprises a matrix driver. A buffered output from each matrix driver is used to drive the staircase generator.

Figure 12:
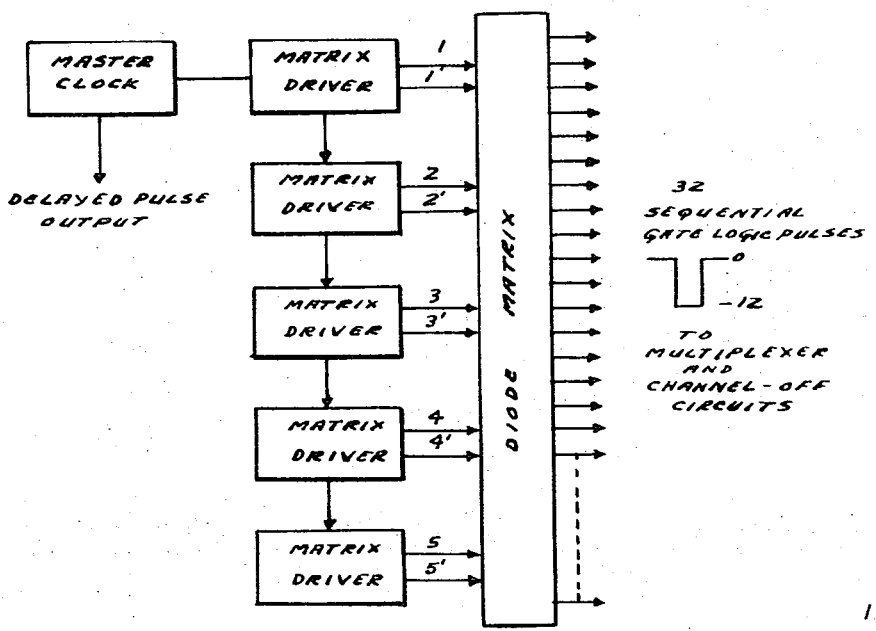
FIG. 12 is a simplified block diagram of the gate-control generator.

A block diagram of the generator to produce sequential gate pulses is shown in FIG. 12. Master clock pulses trigger the initial matrix driver stage. The multivibrators in each matrix driver are connected in the ripple-carry configuration. The 10 logical output pulses from the matrix drivers are connected to a diode matrix to produce the sequential outputs.

Figure 31:
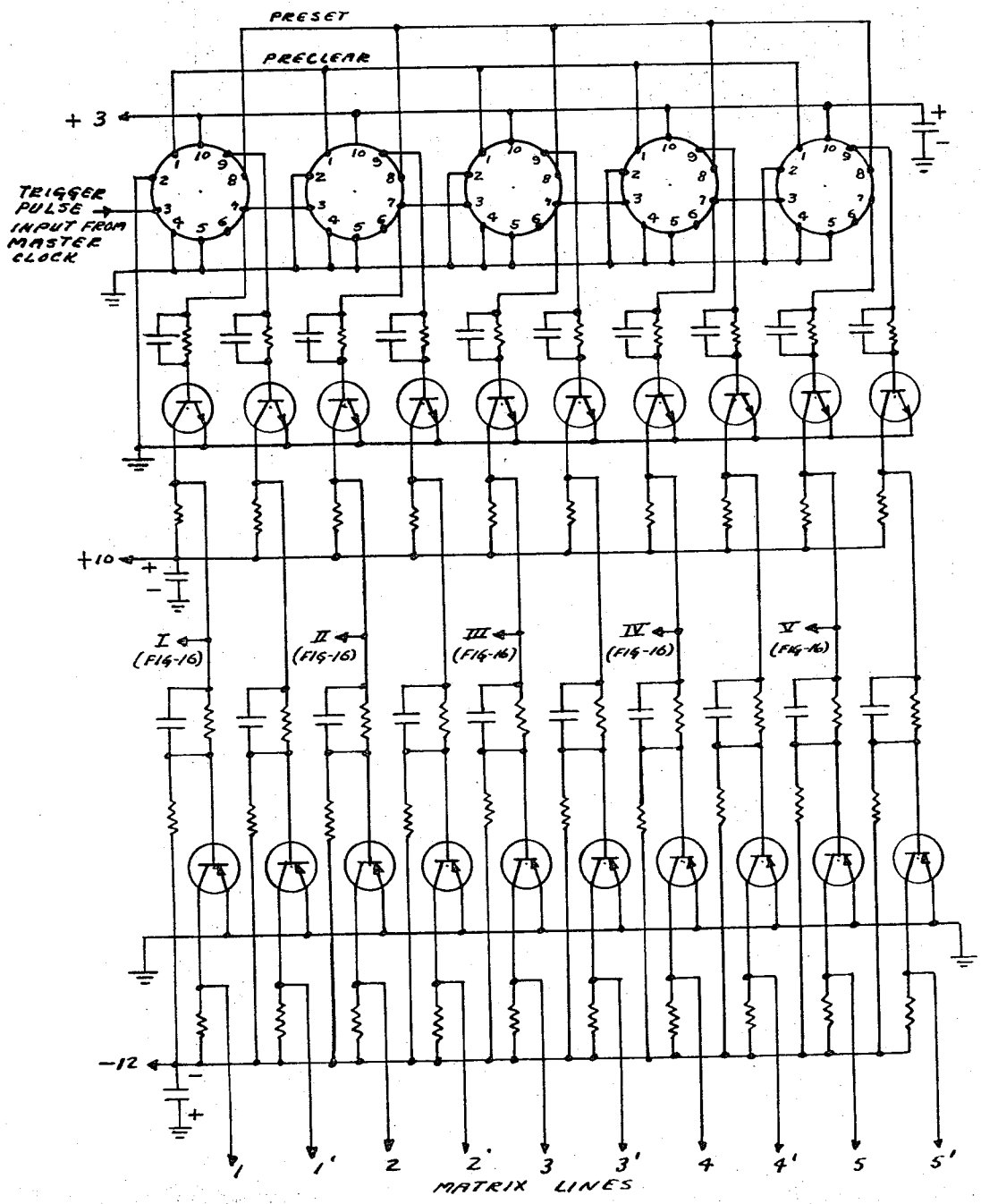
FIG. 31 is a detailed schematic diagram of a buffered logic diode matrix driver as shown in basic form in FIG. 13.
Figure 32A:
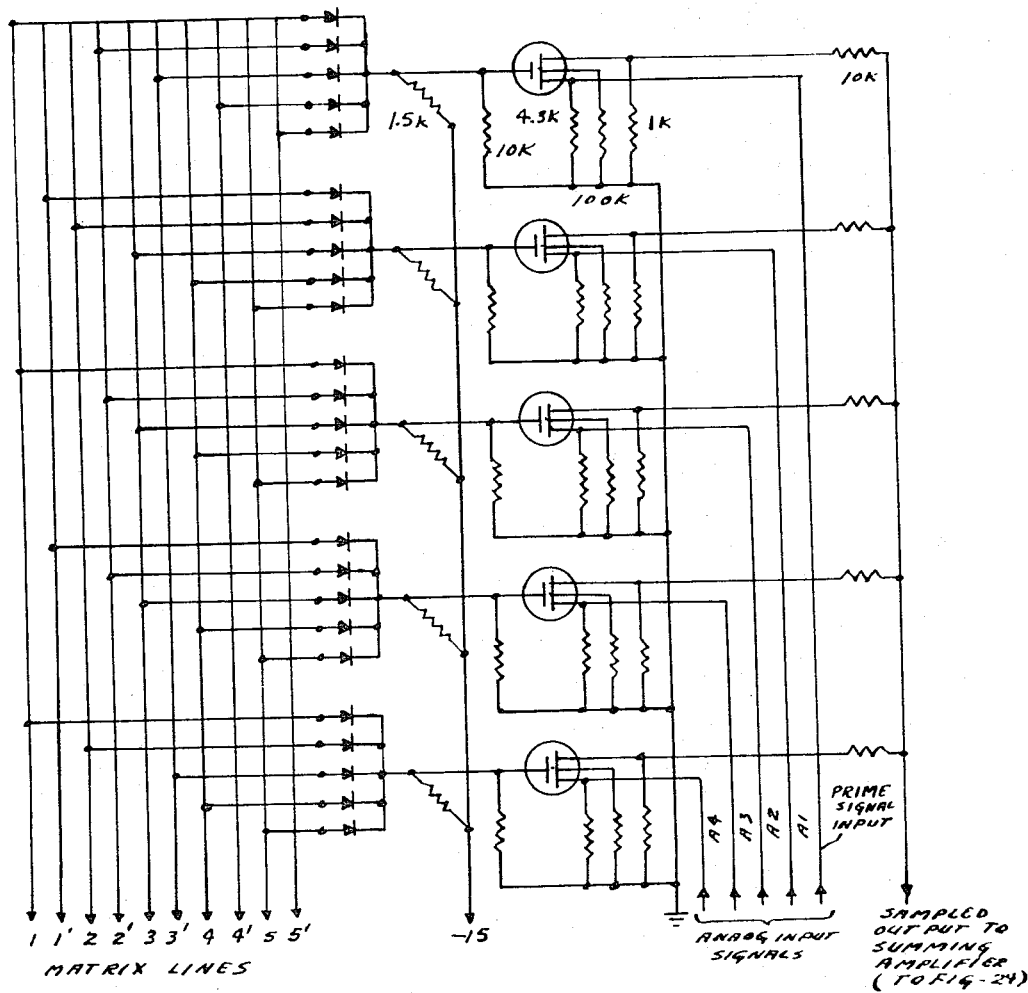
Figure 32B:
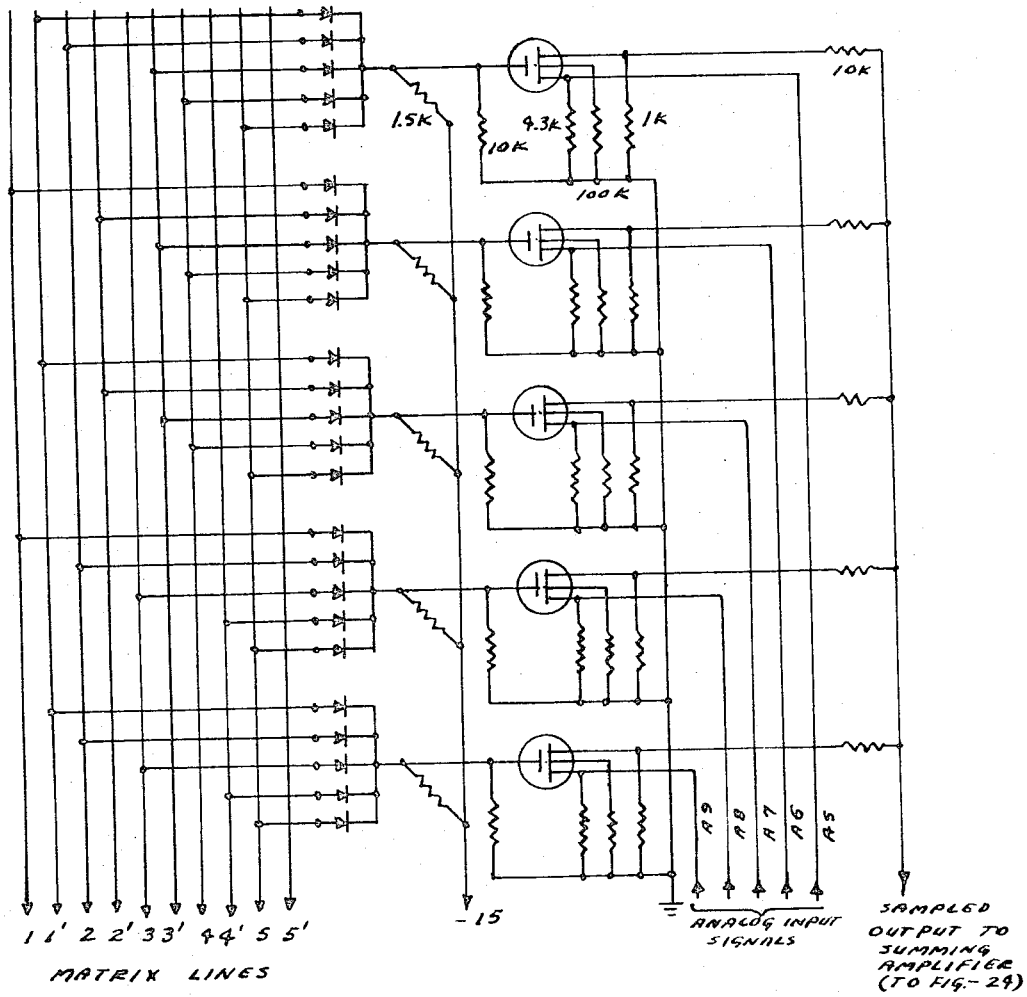
Figure 32D:
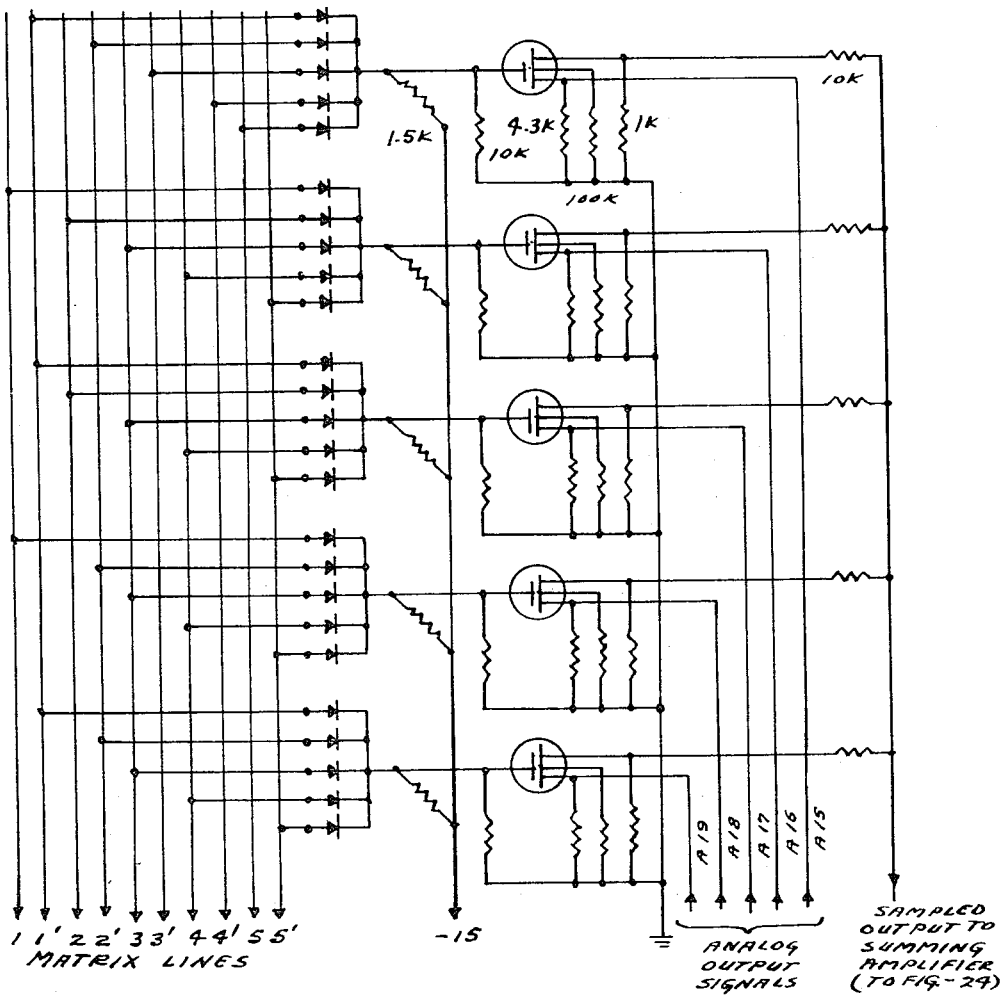
Figure 32C:
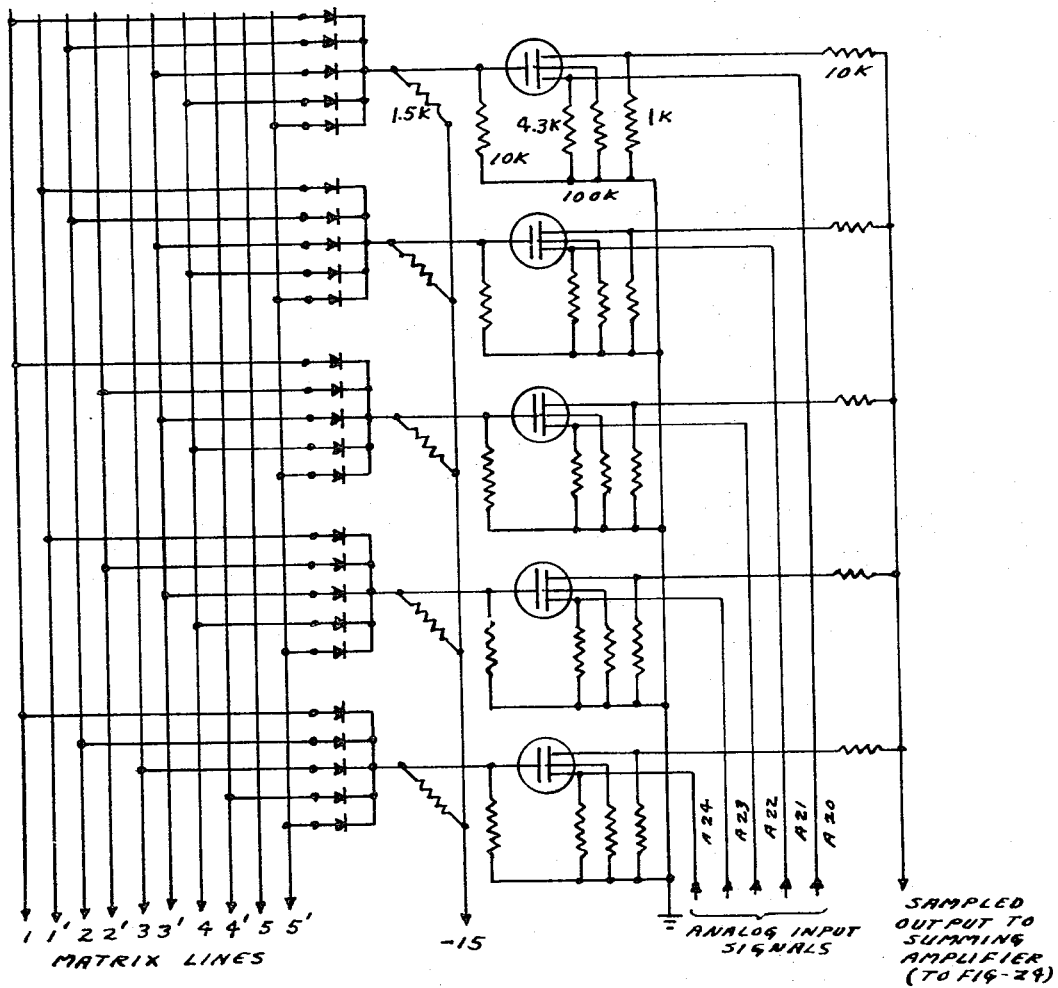

A schematic diagram of an individual matrix driver is shown in FIG. 13. To prevent loading of the relatively low level integrated circuits, buffer stages are used as shown in the Figure. The buffer output is inverted to produce the negative 12-volt pulse required by the diode logic matrix. Only one of the matrix driver circuits is shown in FIG. 13. Five identical matrix drivers are required by the system as is indicated in the gate-control generator block diagram shown in FIG. 12. A detailed schematic diagram of the buffered logic matrix drivers is shown in FIG. 31.

The logical output of the flip-flop 34 is +3 for a logical 1 and 0 volts for a logical 0. The buffers shown in FIG. 13 perform a logical inversion but not a polarity inversion. This is accomplished using the NPN computer-type transistors 35 and 36. A positive signal at the base of transistors 37 or 38 turns off these transistors as they are PNP types.

The flip-flop 34 triggers on a negative-going input transition. In the ripple carry configuration the trigger normally comes from the logical 0 of the preceding stage or a master clock. Some delay is associated with every circuit. The change-of-state delay for a typical integrated circuit flip-flop, such as a type $\mu$L926, is 40 nsec. The delay time $t_d$ can be calculated from the following equation:

$$t_d = n(t-) + (t+)$$

where $n$ equals the number of stages going false. The additional time $t+$ is the time needed for the next stage to change state. For the five-stage ripple carry configuration, $t_d$ can be calculated using the foregoing equation $$t_d = 5(40) + (40) = 240 \text{ nsec.}$$

This propagation delay time can be reduced by techniques such as parallel gating. These same techniques would increase the matrix driver complexity by a considerable factor. With a clock rate $t_r$ of $3.2 \times 10^6$ pulses per second, all 32 channels are sequentially switched in $$t = 1/t_r \times 32$$
$$t = 1/3.2 \times 10^6 \times 32 = 10 \ \mu\text{sec.}$$

The effect of the approximately 240-nsec. delay in the overall total channel sequence time of 10 $\mu$sec. is to produce transients in the matrix logic outputs. Similarly transients are also produced in the staircase output waveforms. As has been previously discussed, the effects of these transients are effectively eliminated using CRT beam-on control techniques.

Figure 14:
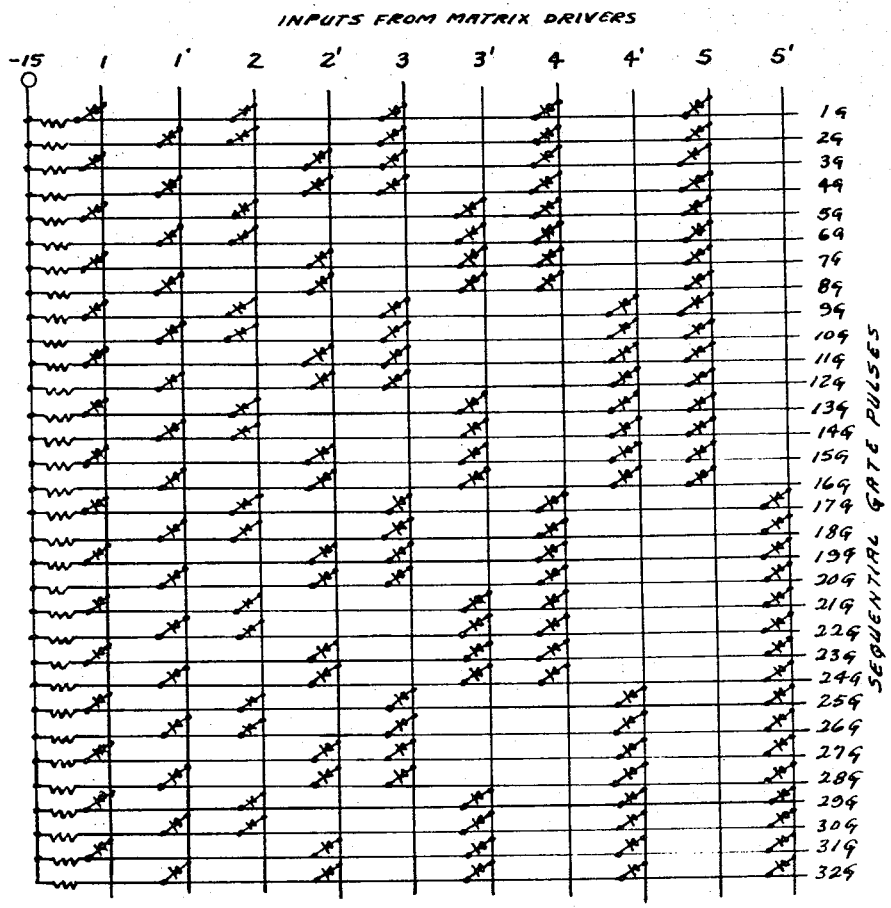
FIG. 14 is a schematic diagram of the counter matrix arrangement for a 32 channel gate-control generator.

The 10 logical outputs of the matrix drivers are applied to the counter matrix scheme shown in FIG. 14. Each of the 160 diodes used should be computer-type diodes such as 1N4154 and each of the 32 resistors are 1.5K ohms. The diode matrix produces a series of negative 12-volt pulses, each about 300 nsec. in duration. These pulses are used to drive either the analog-sampling switches or the channel-off logic circuits.

Sampling Switch Circuitry

The single most important requirement for the sampling switch is high switching speed. Switching speed of the MOSFET is very fast but is highly dependent upon the circuit in which it is used. In order to obtain turn-on times as short as 40 nsec., careful consideration must be given to all circuit parameters, especially source and load impedances.

A P-channel-type MOSFET which consists of an N-type substrate (bulk) into which two separate P-type regions have been diffused, such as a type FT704, has been found to be an example of a suitable MOSFET for use in this application. A schematic diagram of one of the MOSFET sampling switches is shown in FIG. 15. One switch is required for each display channel. A detailed schematic of the analog switching circuits of this embodiment is shown in FIGS. 32a to 32e.

For zero gate voltages (see FIG. 15) no current will flow from source to drain. The path from source to drain has the electrical features of two PN junctions back to back. The application of a negative gate voltage of sufficient amplitude draws holes into the region below the gate so that this channel region changes from a N type to a P type and provides a source to drain conduction path. The gate voltage in effect causes the transistors forward transfer characteristic to shift along the gate-voltage axis. This feature makes the enhancement-type MOS transistor particularly suitable for analog switching applications. In fact the turn-on time of the MOSFET can approach the rise time of the gate turn-on pulse itself. As the flow of current is made possible (enhanced) the MOSFET described is properly called an enhancement-mode device. The off resistance of the type FT704 MOSFET, for example, exceeds 10 gigaohms ($10 \times 10^9$ ohms). The on-state resistance is typically about 1,000 ohms.

The gate in this type transistor is completely isolated from the rest of the device by the metal oxide layer (silicone dioxide). Therefore the input impedance at the gate is that of a capacitor only. This amounts to about three picofarads. The capacitance from gate to drain $C_{gd}$ is about one picofarad. Although this capacitance is very small it represents a major disadvantage of the MOSFET as an analog gate at high-gate drive frequencies. Due to $C_{gd}$ and any stray capacitance present, a portion of the gate drive signal is coupled into the load circuit and causes a voltage spike to appear across the load resistance 40 each time the gate drive signal changes state as $C_{gd}$ and the load resistance form a differentiating network. This can be better understood by referring to the equivalent circuit shown in FIG. 33.

The induced transients can be reduced by using a gate-on signal with poor rise and fall times. Unfortunately this solution cannot be used, as very fast switching speeds must be maintained. Low-source and drain impedances will reduce the amplitude of these spikes. For this reason and to reduce the input and output time constants (and thus increase switching speeds) relatively low-source and load impedances are used. In practice, the induced transients can be reduced but not eliminated. These transients along with other system transients in this invention are eliminated using CRT electron beam control techniques.

Figure 34:
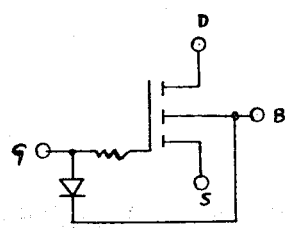
FIG. 34 is a schematic diagram of a typical MOSFET having an integrated gate-protection circuit.

Another problem with MOSFET devices is puncture of the gate insulation. Static charges applied inadvertently to the gate can cause puncture of the very thin metal oxide insulation layer and destroy the device. This is prevented in the type FT704 MOSFET by the integrated gate protection scheme shown in FIG. 34. This consists of a diffused resistor-diode network in the gate circuit which protects against accidental damage due to high voltage transients. This circuit is inherently built into the type FT704 MOSFET. When other MOSFETs are used in practicing this invention, which do not have this feature, it is desirable to include it in the circuitry.

Figure 33:
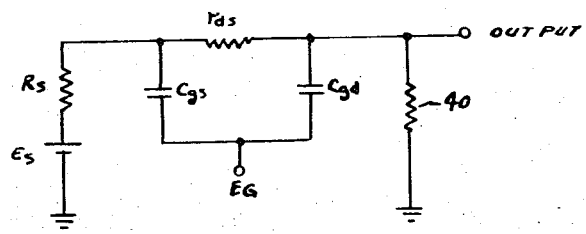
FIG. 33 is a schematic diagram of the equivalent circuit of a MOSFET.

The interelectrode capacitances of the MOSFET affect the operation in sampling switch circuits at high signal frequencies. As shown in FIG. 33, $C_{gd}$ and $C_{gs}$ together form a series capacitance in parallel with the drain to source impedance $r_{ds}$. When the reactance of this effective capacitance becomes significantly lower than the MOSFET off-state resistance the input signal can be transferred into the load circuit even when no gate-on pulse is present. This problem is of minor concern in the embodiment of this invention being described as the signal frequency in this application does not exceed 10,000 Hz. It would become a problem at signal frequencies in excess of several megahertz, but such operation is beyond the scope of this invention.

Figure 35:
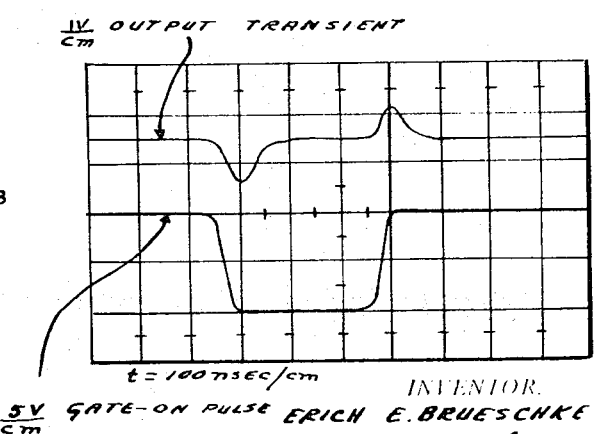
FIG. 35 shows a typical gate-on signal and the transient induced in the output of a MOSFET.

Referring further to the schematic of the ultrafast sampling switch as shown in FIG. 15; in the absence of a negative gate-on pulse from the gate-control generator matrix, MOSFET 41 represents a series resistance of approximately 10 gigaohms between the input and the output. The variable resistor 42 is a gain adjust control to compensate for variations in MOSFET on-state resistance. Resistor 43 is the summing junction resistor for the operational amplifier inverting summer. A typical gate-on signal and the transient induced in the output (across resistance 40) are shown in FIG. 35.

The combination of the master clock, the matrix drivers, the gate-control generator matrix and the MOSFET sampling switches constitute the ultrafast time-division multiplexer. The circuit for only one sampling switch is shown in FIG. 15. As previously mentioned, a sampling switch is required for each display channel. Diodes 44 and 45 protect the switch from excessive input voltages.

Staircase Generator Circuitry

A 32-step staircase is produced by summing the logical buffered outputs from each of the five matrix drive circuits, (see FIGS. 12 and 31), using a typical ladder-type staircase generator. The staircase generator circuit is shown in FIG. 16. It consists of five identical wave-shaping circuits.

Positive input pulses from the matrix drivers are logically inverted and inverted in polarity by each of the PNP transistors 50. (As the five circuits are identical, only the operation of one will be discussed.) Resistor 51 and capacitor 52 comprise a switching-time speed-up technique. Transistor 50 is normally saturated due to the base current supplied through resistor 53. A positive input pulse causes transistor 50 to turn off for the duration of the input pulse. Diode 54 prevents feedback of the negative supply voltage into the matrix driver through resistors 51 and 53.

Figure 17:
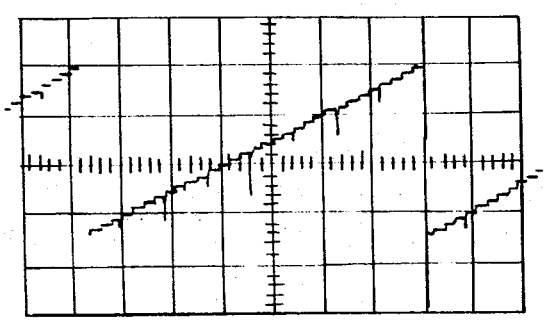
FIG. 17 is a drawing from an oscilloscope trace showing the output signal from the staircase generator.

For precise staircase performance, the output pulse amplitude at the collector of transistor 50 in each of the five circuits is clamped at a negative 5.1 volts by the zener diode 55. The staircase output is shown in FIG. 17. Each step of the staircase is approximately 310 nsec. in duration. The sharp downward deflections shown in the Figure are the switching transients caused by delays in the staircase generator driving logic. The staircase output is applied to the vertical signal summing amplifier where it will be used to position the beam vertically. In addition it is applied to the horizontal summing amplifier to produce display skew.

Horizontal Scanning and Triggering Circuits

The horizontal scan circuits produce a linear ramp which is triggered either by a manual trigger, an internal variable free-running trigger, an external trigger or a delayed external trigger.

A block diagram of the manual trigger and the basic scan triggering interconnections is shown in FIG. 18. Switch 60 selects the trigger mode. When in the manual trigger mode, triggering is controlled by switch 61. Capacitor 62 is normally charged to a positive 15 volts through $R_1$. When switch 61 is closed a positive pulse is applied to the trigger input of the linear sweep generator. The voltage at the linear sweep trigger input quickly drops to much less than 1 volt as its input impedance is about 2.2 K ohms. Capacitor 62 discharges to less than the linear sweep triggering level in about 2 msec. As the shortest horizontal sweep period is 5 msec., inadvertent multiple sweeps due to single-event manual trigger actuations cannot occur. Capacitor 62 recharges in about 0.1 second when the pushbutton switch 61 is released. This is less than the normal human reaction time and therefore the manual trigger can be triggered at any rate within human capability.

The same basic timing circuit is used for the variable trigger generator, the trigger delay generator, and the linear sweep generator. This consists of a PNP transistor used as a constant-current generator and a unijunction transistor used as a level-sensing relaxation oscillator. A silicon-controlled rectifier (SCR) is used to trigger the delay generator and the linear sweep generator.

The operation and design of the trigger and sweep generator circuits will not be discussed in detail. Design of constant-current linear sweep generators is well known as is the use of unijunction transistors for timing and sensing circuits.

Figure 19:
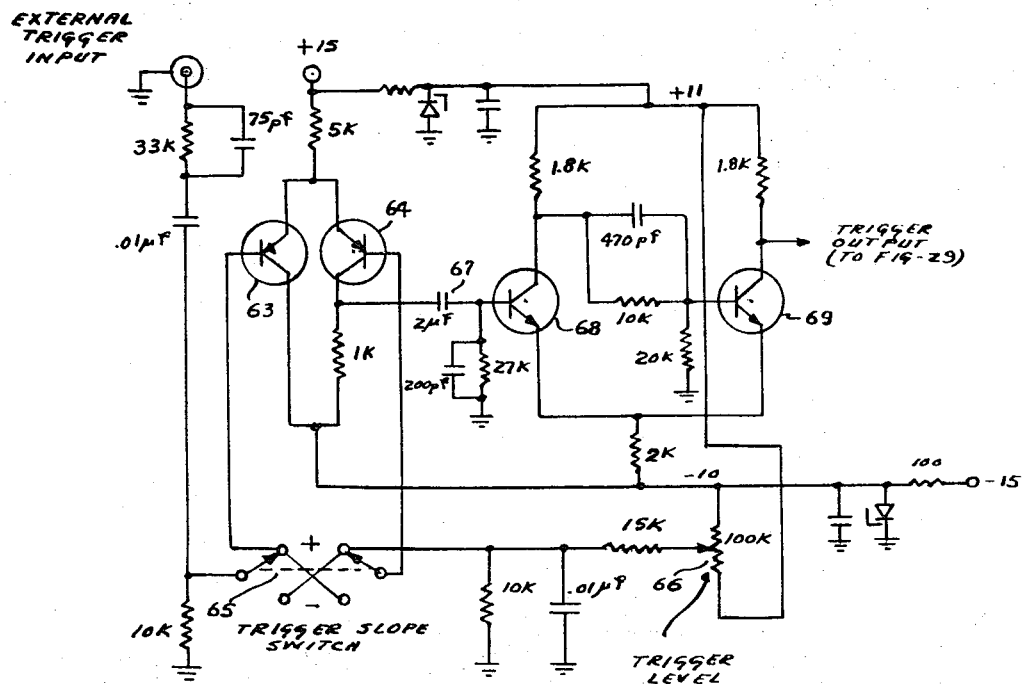
FIG. 19 is a schematic diagram of a trigger level circuit.

The trigger level circuit is shown in FIG. 19. The external trigger input signal is coupled to either the base of transistor 63 or 64, depending on the position of the trigger slope switch 65. The trigger level control 66 determines the base bias on the transistor (63 or 64) not receiving the external trigger input signal. Transistors 63 and 64 comprise an emitter coupled amplifier. The pulse output of the trigger amplifier is coupled through capacitor 67 to the base of transistor 68. Transistors 68 and 69 comprise a conventional Schmitt trigger.

As shown in the block diagram (FIG. 18), the output of the trigger level circuit goes both to the trigger delay generator and to switch 60. As a result, the linear sweep generator can be triggered directly or after a finite time delay determined by the delay generator.

Figure 20:
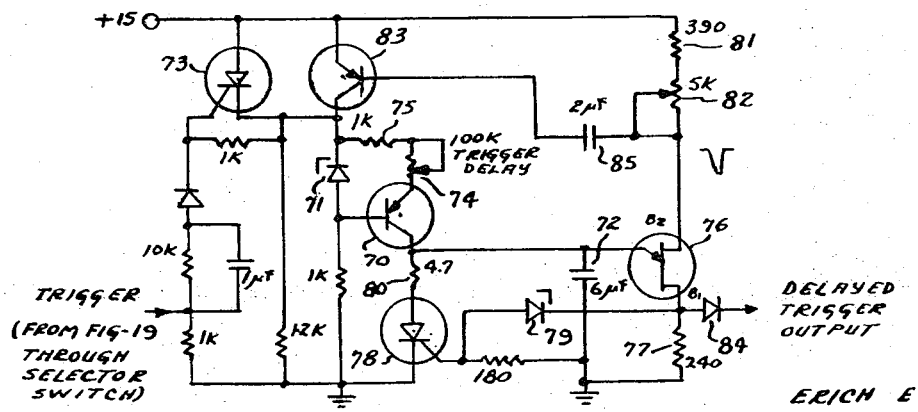
FIG. 20 is a schematic diagram of a trigger delay generator.

The basic circuit diagram of the trigger delay generator is shown in FIG. 20. Because the base of transistor 70 is held at a constant voltage by the zener diode 71, it becomes a constant-current generator charging capacitor 72. Neglecting base current, it may be assumed that the collector current equals the emitter current (of transistor 70). The constant collector current develops a ramp voltage across capacitor 72. That is:

$$\Delta V/\Delta t = I_c/C$$

where $V$ is the voltage across capacitor 72 ($+V$ maximum), $I_c$ is the collector current of transistor 70, and $t$ is the ramp voltage time (or sweep time).

Charging of capacitor 72 is initiated by a positive pulse at the gate of the SCR 73. Current then flows through transistor 70 through resistances 74 and 75. The constant-current rate (and therefore the charging time of capacitor 72) is controlled by adjusting variable resistance 74. Depending on the intrinsic standoff ratio ($\eta$) of the unijunction transistor 76, a voltage level will be reached across capacitor 72 sufficient to cause firing of unijunction transistor 76. As a result a positive pulse is produced across resistance 77 which fires SCR 78 through zener diode 79. SCR 78 is then fully on and rapidly discharges the timing capacitor 72 through the 4.7-ohm current-limiting resistor 80. At the same time a negative pulse is produced across resistances 81 and 82 when unijunction transistor 76 fires. This is used to turn on the PNP transistor 83. When transistor 83 conducts fully the voltage across SCR 73 becomes less than the on-state sustaining voltage for it and it ceases to conduct (resets). This removes the voltage from transistor 70 and the circuit is ready for the next trigger pulse. With resistance 74 at zero, variable resistance 82 is used to calibrate $t$ (ramp voltage sweep time).

As transistor 70 is a constant current generator, the charging time for capacitor 72 is $$t = RC$$

where $$R = R_{74} + R_{75}.$$

In summary, an external trigger pulse fires SCR 73, this causes transistor 70 to conduct and charge capacitor 72 at a constant rate. At a particular (but constant) voltage, unijunction transistor 76 fires and produces an output pulse (delayed trigger output) through diode 84 across resistance 77. Rapid discharge of capacitor 72 is achieved by firing SCR 78 which shorts capacitance 72 through resistance 80. The circuit is reset by the negative pulse through capacitor 85 which causes transistor 83 to conduct and SCR 73 to reset.

Figure 21:
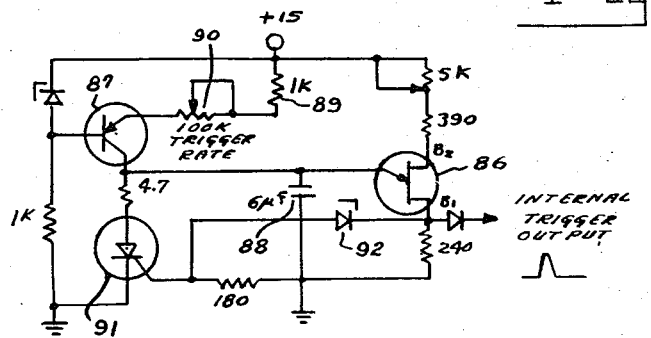
FIG. 21 is a schematic diagram of the internal variable trigger generator.

The internal trigger generator, shown schematically in FIG. 21, is similar to the trigger delay generator in that it uses a constant-current generator to produce a voltage ramp. This ramp is variable and the time required to reach the firing point of a unijunction transistor can be adjusted over a wide range. The normal positive output pulse available between base-one ($B_1$) of unijunction transistor 86 and ground is used as the output trigger pulse. This circuit differs from the trigger delay generator in that it is free-running. This is accomplished essentially by removing the SCR from the previous circuit.

Transistor 87 is a constant current generator which charges capacitor 88 at a constant rate. This charging rate (and therefore the eventual pulse output rate) is controlled by resistances 89 and 90. When the peak-point voltage (firing voltage of unijunction transistor 86) is reached, unijunction transistor 86 conducts and a positive output pulse is produced. This pulse also fires SCR 91 through diode 92. SCR 91 rapidly discharges capacitor 88 and a point is reached where SCR 91 can no longer conduct (due to insufficient holding current at the so-called valley point) and SCR 91 becomes an open circuit. Transistor 87 then starts to recharge capacitor 88 and the cycle is repeated.

Figure 29:
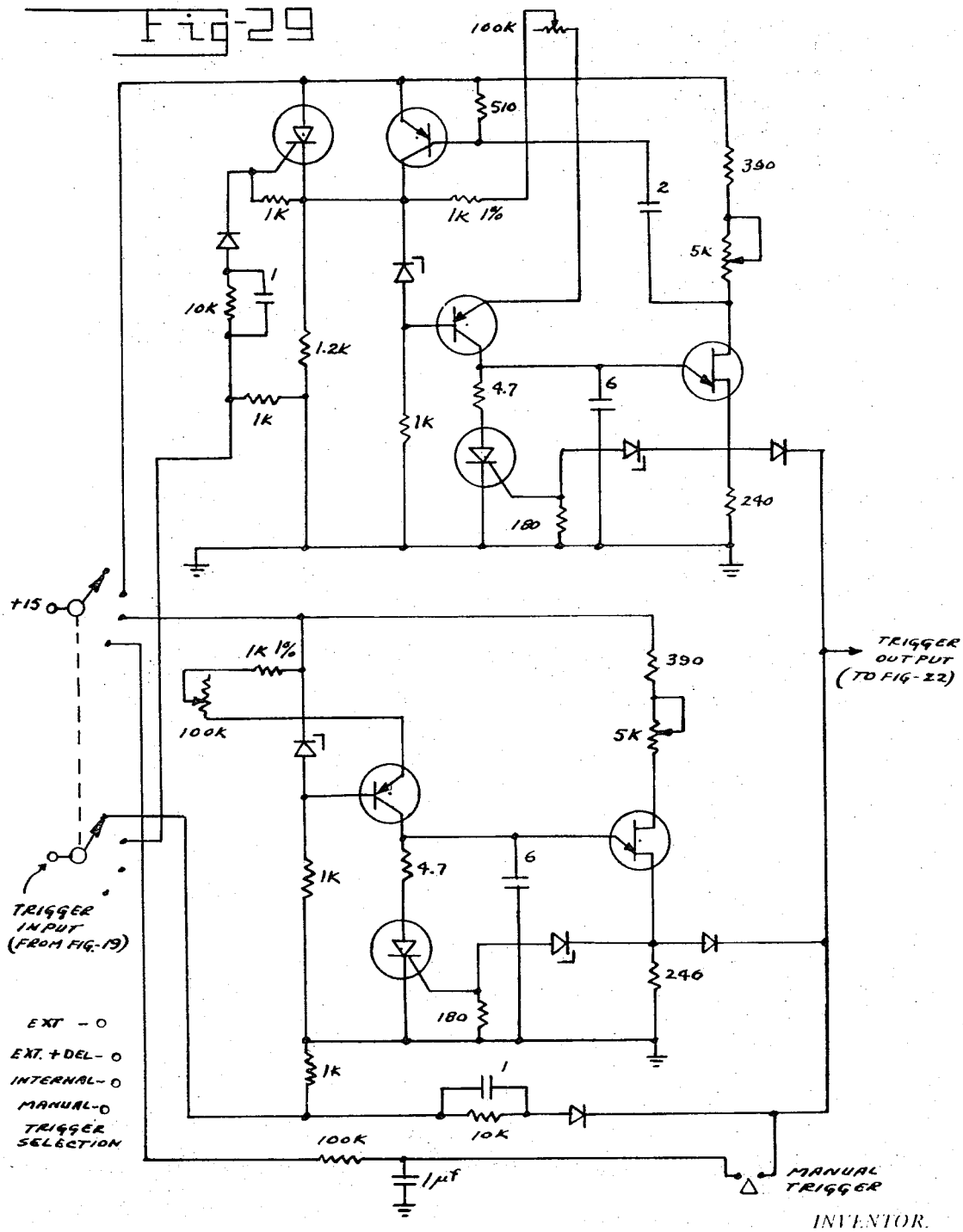
FIG. 29 is a schematic diagram showing the cooperation of the trigger circuits of FIGS. 20 and 21 with the front panel trigger controls.

FIG. 29 shows a detail schematic diagram of the combined trigger circuits, and their relation to the front-panel trigger mode selector switch.

Figure 22:
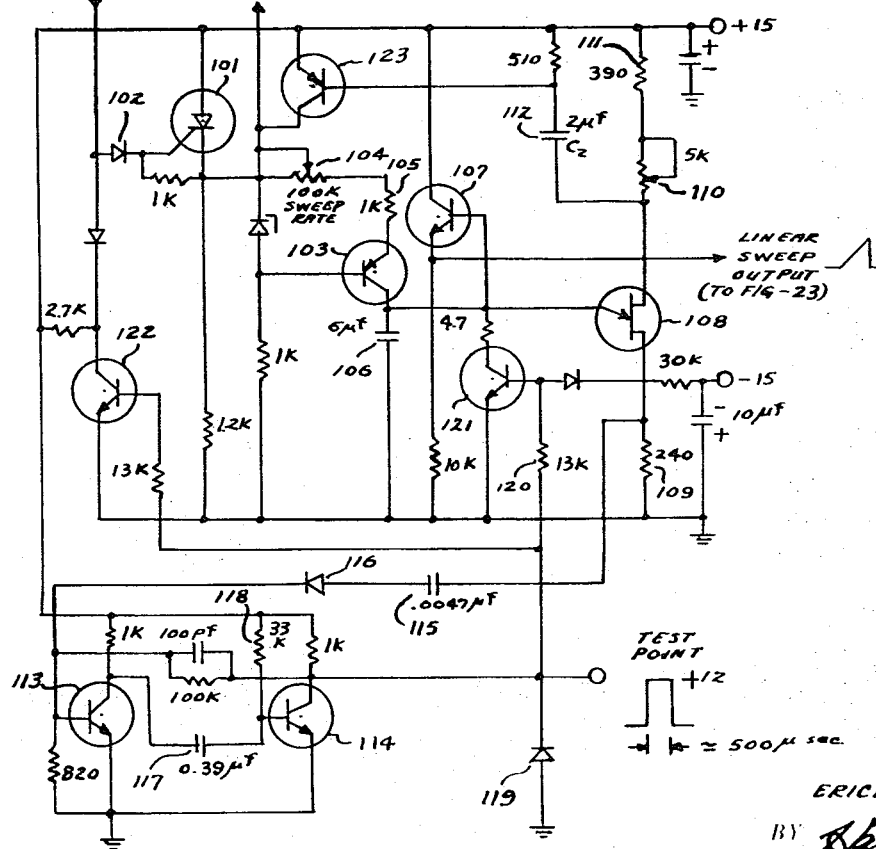
FIG. 22 is a schematic diagram of a triggered linear sweep generator.

The linear sweep generator used in this embodiment and shown schematically in FIG. 22 is a sophisticated form of a constant-current ramp generator. The generator has a variable sweep time and is very linear over a wide range of sweep rates (<< 5 msec. to 5 sec.). Maintenance of linear sweep at slow sweep rates is achieved using an emitter follower output stage which presents a very high impedance to the sweep-timing capacitor.

A uniform sweep takeoff point is achieved by assuring almost total discharge of the timing capacitor. This is realized by holding on a timing capacitor discharge circuit for 500 $\mu$sec. after every sweep. This same circuit prevents ambiguous triggering of the sweep by holding off all trigger inputs during discharge of the timing capacitor. The timing capacitor must have a low leakage. Metallized-mylar types are examples of types of capacitors that have been found to be suitable in this application.

When a positive trigger voltage of approximately 5 volts is applied to the gate of SCR 101 through diode 102, full conduction of SCR 101 occurs. As a result the +15 supply voltage is applied to the emitter of transistor 103 through resistances 104 and 105. Transistor 103 is a constant-current generator which immediately starts to charge capacitor 106 at a constant rate. This rate is determined by the magnitude of the sweep time adjustment potentiometer 104 and by resistance 105. Capacitor 106 charges at a linear rate producing a linear ramp voltage. The ramp voltage is applied to the base of transistor 107 which is in the emitter-follower configuration. This configuration results in an input impedance at the base of transistor 107 in excess of 2 megohms when transistor 107 has a beta or $h_{fe}$ in excess of 200, which is preferable.

As has been previously described for the internal trigger generator and the trigger delay generator, a ramp voltage level will be ultimately reached such that the unijunction transistor 108 is fired. A positive pulse is produced across resistance 109 and a negative pulse is produced across resistances 110 and 111. The negative pulse is conducted to the base of transistor 103 through capacitor 112. Transistor 123 becomes fully conductive and reduces the voltage across SCR 101 to such a low value that it becomes nonconductive (resets). At the same time the positive pulse output across resistance 109 triggers on the monostable multivibrator composed of transistors 113 and 114.

The monostable multivibrator produces a +12-volt pulse approximately 500 $\mu$sec. in duration each time the positive trigger pulse occurs across resistance 109. The pulse is coupled to the base of transistor 113 by capacitor 115, and diode 116. The duration of the output pulse at the collector of transistor 114 is primarily determined by the time constant of capacitor 117 and resistance 118 during discharge. Diode 119 prevents negative voltages from being coupled to the collector of transistor 114 through resistance 120 by shunting them to ground.

Two functions are performed by the monostable multivibrator output pulse. First transistor 121 is turned on for 500 $\mu$sec. to achieve essentially full discharge of capacitor 106. This prevents an apparent shortening of the voltage ramp due to residual stored charge in capacitor 106. Second, the pulse saturates transistor 122 for 500 $\mu$sec. which shunts any trigger input pulses to ground. This prevents triggering of SCR 101 until after capacitor 106 is discharged.

Skew Control and Horizontal Output Circuitry

Figure 23:
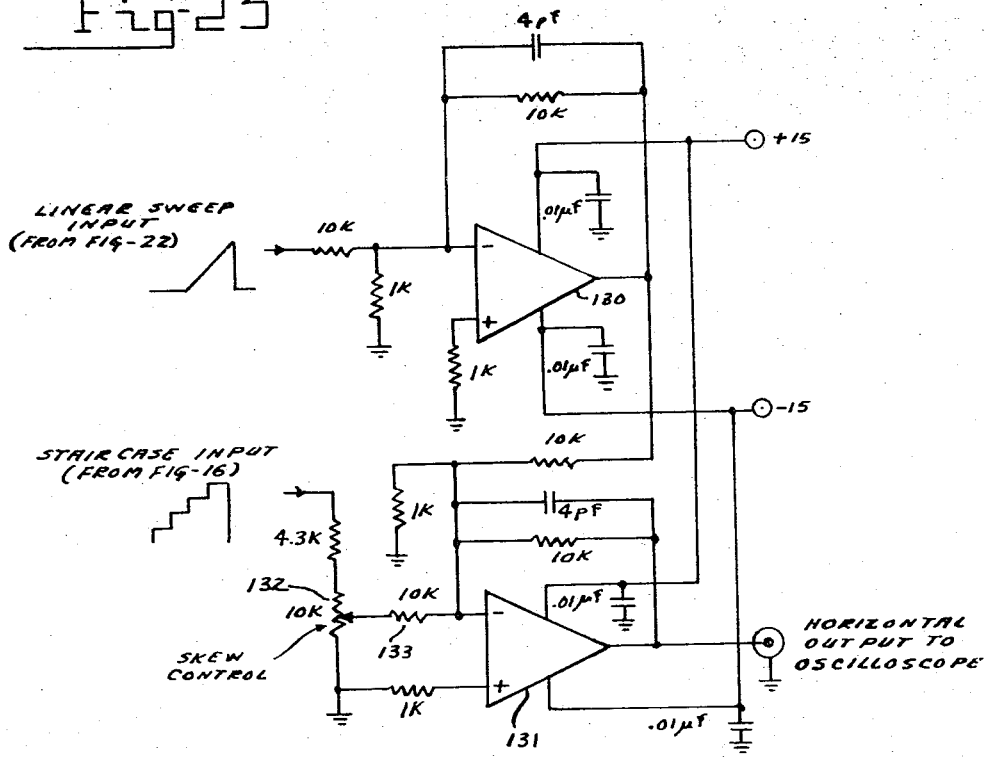
FIG. 23 is a schematic diagram of a skew control and horizontal signal output circuit.

The skew control and horizontal output circuit are shown in FIG. 23. The voltage ramp from the triggered linear sweep generator is inverted by operational amplifier 130 and summed with the staircase voltage from the staircase generator using operational amplifier 131 which is in the inverting-summer configuration.

When skew control 132 is fully counterclockwise, no staircase voltage is applied to the inverting-summer 131 and the display has no skew. Skew is produced when the skew control 132 supplies a fraction of the staircase voltage to the summing junction through resistance 133. Operational amplifiers 130 and 131 are conventional wideband, fast-response integrated circuit operational amplifiers, such as type 1004-01.

Analog Signal Summer and Vertical Output Circuitry

Figure 24:
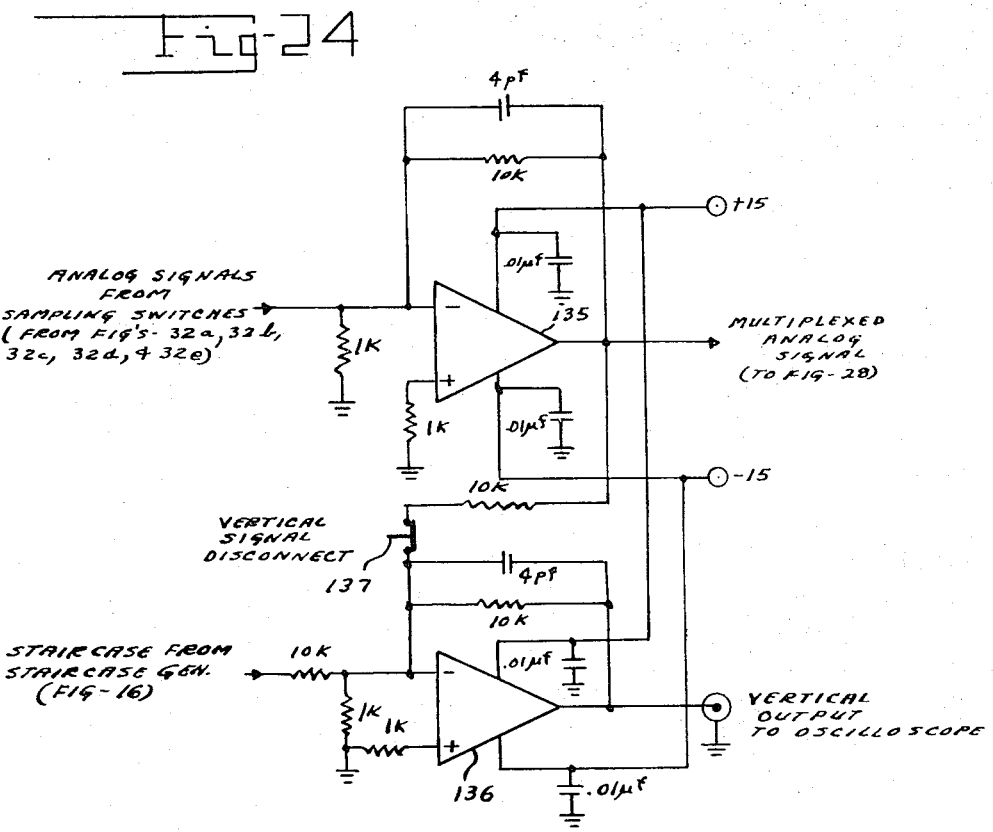
FIG. 24 is a schematic diagram of an analog signal summer and vertical output circuit.

The analog signal summer and vertical output circuits are shown in FIG. 24. The sampled outputs of all ultrafast sampling switches are connected in common to the summing junction of integrated circuit operational amplifier 135. It functions as a high-slewing rate operational amplifier connected as an inverting-summer.

The summed analog output (multiplexed output) from amplifier 135 has two functions. First, it is connected into the intensity modulation circuits where it is used to achieve individual channel intensity modulation. Second, the summed signal is connected to the summing junction of operational amplifier 136, which sums the staircase voltage from the staircase generator with the time-division-multiplexed output of amplifier 135. The vertical output is then a composite of the 32-step staircase and the multiplexed analog signal channels.

Because the same logic that produces the 32-step staircase voltage also produces the 32 sequential gate pulses, a given step on the staircase always corresponds to a given sequential gate pulse and consequently a given analog signal-sampling switch. For example, sequential gate pulse number 15 (from the matrix shown in FIG. 14) will cause sampling switch number 15 to become conductive at the precise moment in time that staircase step number 15 occurs. As a result only information from analog signal channel number 15 is present in the multiplexed output at the instant it is summed with the voltage corresponding to staircase step 15 by operational amplifier 136.

Beam Intensity Modulation Circuits

The function of the beam intensity modulation circuits is to turn on the electron beam of the cathode-ray tube display at a precise moment in time and with a precise intensity. At that moment when the beam is turned on, a small spot of light is produced on the CRT face. The X-Y position of this spot is determined by the instantaneous values of the horizontal and vertical deflection signals. In order that a proper relationship is maintained between the beam-on circuits and all other circuits, all events are controlled by a delayed pulse from the master clock. A given delayed clock pulse is selected to compensate for propagation delays which are present in the system. This is accomplished by selecting the appropriate tap position of the switch shown in FIG. 11. In most instances using conventional oscilloscopes with this invention, the first or second delay has been found suitable to give a good display. Other oscilloscopes may require the longer delay times that are provided.

Logic circuits are provided to ensure that the CRT electron beam is not allowed to turn on unless a horizontal sweep-on signal is present. This is accomplished by disabling the beam-on logic circuits when sweep-on signals are not present. Depending on the particular display desired, several channels may be blanked out to allow spacing between the various input signals or to prevent display of unused or unwanted channels. This is achieved by development of channel-off logic.

Intensity modulation of the individual analog signals is required to reduce ambiguity at those points where two or more signals cross and to enhance the quasi-three-dimensional effect. This intensity modulation is accomplished by summing the multiplexed analog signal with the beam-on pulse. The result is a beam-on pulse which varies in amplitude (and thus beam intensity) with variations in analog signal amplitude.

A block diagram which summarizes the intensity modulation circuits is shown in FIG. 25. The intensity modulation circuits are synchronized with the master clock through the delayed clock pulse 140. This pulse is only about 75 nsec. in length and must be processed into a square 150-nsec. beam-on pulse. This is accomplished by using a monostable multivibrator 141 capable of producing an ultrafast square pulse. The positive pulse produced is inverted 142 and applied to the beam-on control logic circuits 143. These pulses occur continuously at the master clock rate (3.2 MHz) and will ultimately turn on the CRT electron beam unless disabled by the OR circuit 144.

Channel-off logic 145 from the main logic circuits is summed 146 and applied to the transistor OR circuit 144. A sweep-on signal 147 is inverted 148 and becomes a sweep-off indication. Either the summed channel-off logic signal or the inverted sweep-on signal will cause a beam-on pulse disable condition by the beam-on control logic circuits 143. Assuming the logic is such that the inverted pulse from the monostable multivibrator is allowed to pass, the pulse is applied to one summing junction of the wide-band power summer 149 where it will turn on the CRT cathode to produce a small midintensity spot on the screen.

When intensity modulation of each individual analog signal channel is desired, a signal is developed which will change the relative amplitude of each beam-on pulse at the proper instant. This signal is obtained from the multiplexed analog signal input 150 which has already been inverted by the gate output analog summer. The signal is again inverted by the inverting summer 151 and applied to the wideband power summer 149. Here the instantaneous analog signal is summed with the controlled beam-on pulse. The result is a negative-going signal which is applied to the CRT cathode.

The monostable multivibrator and inverter shown schematically in FIG. 26 generates a positive 11-volt, 150-nsec. beam-on pulse in response to a delayed clock triggering pulse. This pulse will ultimately beam on the CRT unless disabled by the beam-on control logic.

An integrated circuit voltage comparator operational amplifier 155 is used as a very short duration monostable multivibrator. An example of a suitable-type integrated circuit is the type μA710. The multivibrator configuration produces an output pulse for each trigger input pulse. A highly stable triggering point is provided (± 10 mV over a ± 5-v. range) with short output pulse lengths.

The monostable multivibrator shown produces a pulse of approximately 160 nsec. with a 3.2-MHz repetition rate. The interpulse interval is therefore 150 nsec. Transistor 156 logically inverts the 160-nsec. positive pulse and produces a positive output pulse equal to the interpulse interval (150 nsec.). It is desirable that transistor 156 be a very high speed NPN switching type which can produce a fast-rise-time output pulse. A type 2N709 is an example of a suitable transistor. The speedup capacitor 157 reduces the rise and fall time of the output pulse. During transistor turn-on the speedup capacitor bypasses the current-limiting resistor 158 and provides peak overdrive current. During transistor turnoff the speedup capacitor minimizes the storage time by supplying the excess current required to draw the majority carriers from the base region and the stored charge from the collector region of transistor 156.

Figure 27:
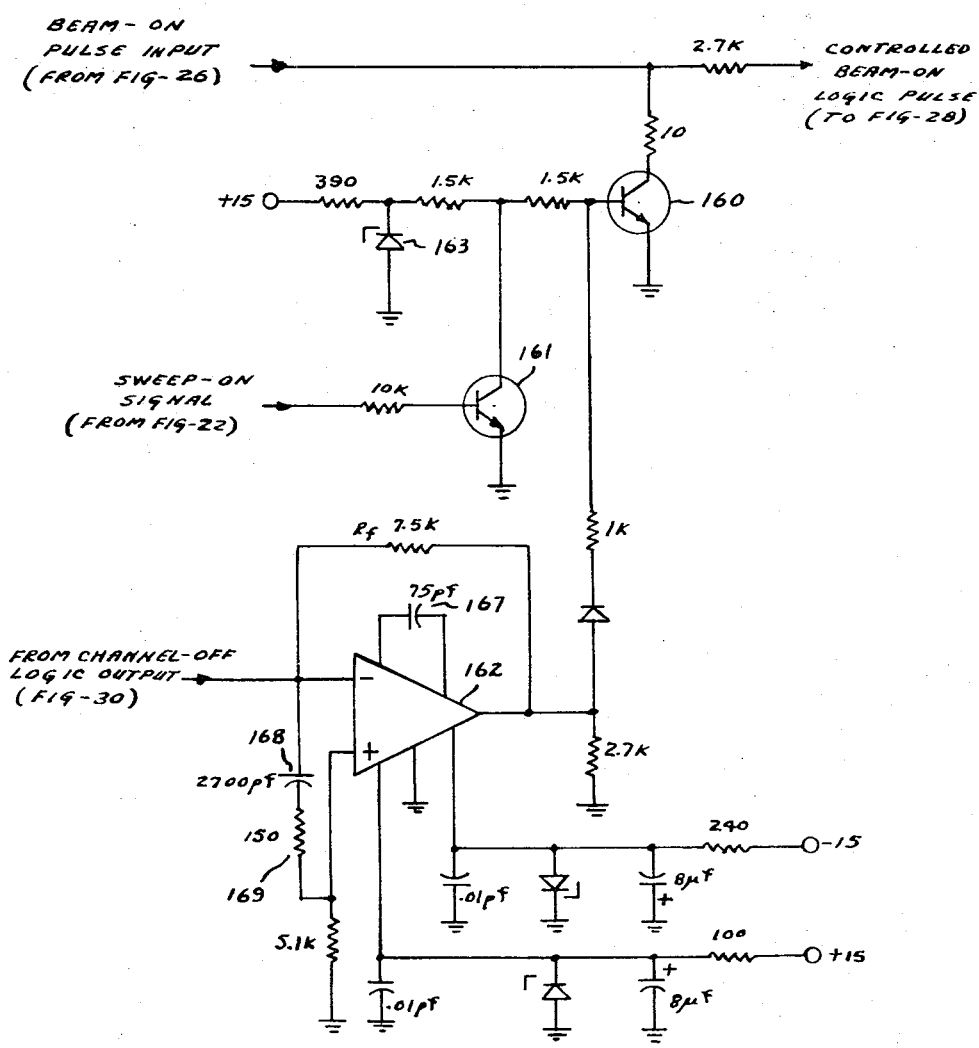
FIG. 27 is a schematic diagram of a channel-off summer and beam-on logic circuit.

The pulse output 159 from the multivibrator and pulse inverter circuit shown in FIG. 26 is used to turn-on the display of the CRT, that is plot a momentary point unless disabled by the beam-on control logic circuits shown in FIG. 27. With no control inputs the beam-on input must be disabled. Two criteria must be met before the beam-on control circuits are enabled. First, a sweep-on signal must be present to indicate that the horizontal sweep circuits are active. This is so that no CRT beam-on takes place unless the sweep circuits are triggered into operation. Among other things, this feature prevents CRT screen damage due to a prolonged stationary spot of light. In addition it is a requirement for display photography. The second criteria is that presence of a channel-off logic signal must prevent display of any given channel by disabling the beam-on pulse.

Consider that B is the presence of a controlled beam-on logic pulse output, S is the presence of a sweep-on signal, C is the presence of a channel-off logic signal and D is a signal which will disable the beam-on pulse in the absence of sweep-on signals. Three active elements are present; transistor 160, represented as $Q_1$, is a shunt-connected gate transistor used to control the beam-on pulse, transistor 161, represented as $Q_2$, is an inverter (logic) to change the sweep-on indication to a sweep-off indication, and an integrated circuit operational amplifier 162, represented as $Q_3$, used as a voltage summer and inverter (nonlogic) of the channel-off logic pulses. Amplifier 162 sums the pulses and changes their polarity but does not invert them logically. The presence of a control signal or conduction of an active element is considered to be a logical 1. Using Boolean-algebra notation the circuit logic requirements for the presence of a beam-on pulse output B are:

$$B=S\overline{C}+\overline{D}\,\overline{C}$$
$$B=(S+\overline{D})\overline{C}$$
$$S=Q_2$$
$$C=Q_3$$

substituting into the second equation:
$$B=(Q_2+\overline{D})\overline{Q}_3$$
however because D exists at all times then
$$\overline{D}=0$$
and $$B=Q_2\overline{Q}_3$$
$$B=\overline{Q}_1$$
$$\overline{Q}_1=Q_2\overline{Q}_3$$

using De Morgan's theorem this can be rewritten
$$Q_1=\overline{Q}_2+Q_3.$$

When transistor 160 is nonconducting, the beam-on logic pulse is allowed to pass and becomes the output pulse termed the controlled beam-on logic pulse. This satisfies equation $B=\overline{Q}_1$. An appropriate positive voltage at the base of transistor 160 will cause it to conduct.

The zener voltage across diode 163 is applied to the base of transistor 160 unless shunted to ground by transistor 161. Transistor 161 conducts when a positive sweep-on voltage is supplied ($S=Q_2$). A negative pulse input to amplifier 162 ($Q_3$) is inverted in polarity and becomes a positive pulse ($C=Q_3$) which is applied to the base of transistor 160 to cause it to conduct, which disables the beam-on output pulse. Therefore nonconduction of $Q_2$ or a positive pulse output from $Q_3$ will turn-on $Q_1(Q_1=\overline{Q}_2+Q_3)$ and disable the beam-on pulse.

Figure 30:
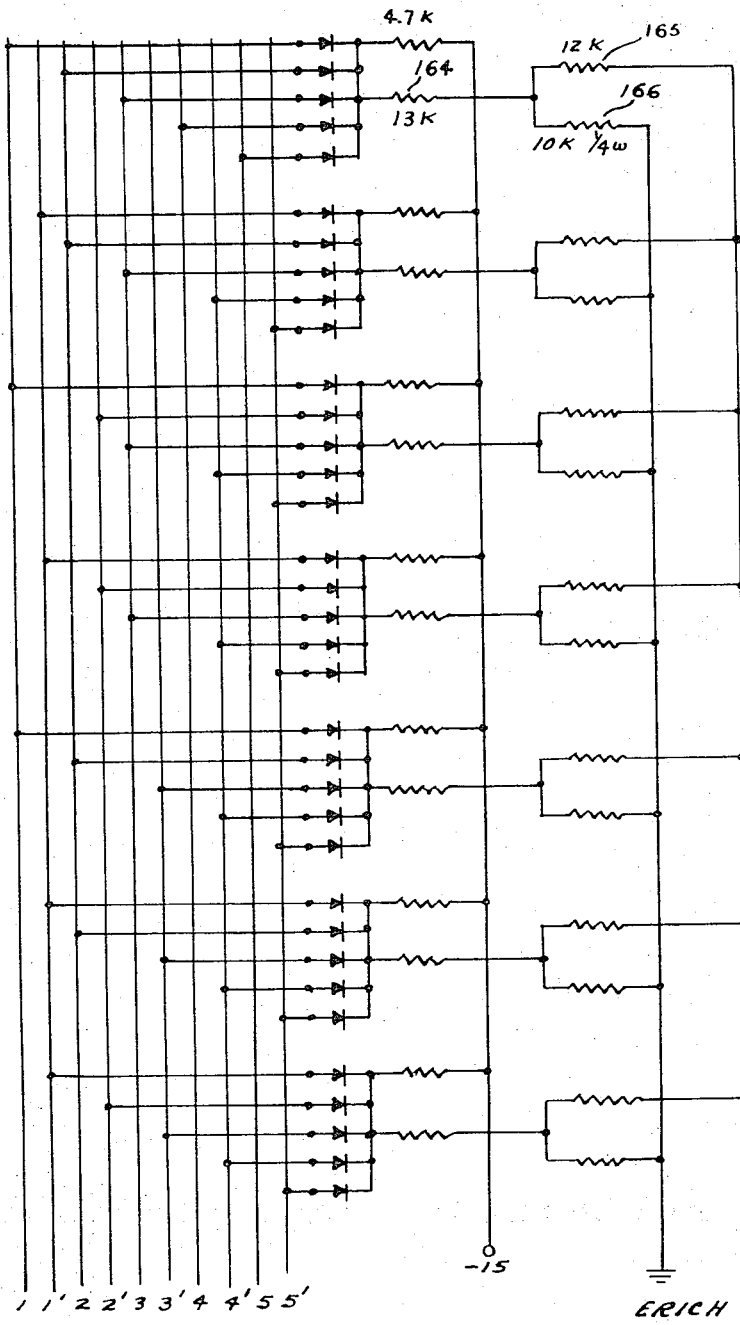
FIG. 30 is a schematic diagram of the channel-off logic circuit.

Any sequential gate pulse from the matrix shown in FIG. 14 can be used as a channel-off signal. An independent coupling network composed of resistances 164, 165, and 166 shown in FIG. 30 is required for each separate sequential gate pulse used as a channel-off logic input. The schematic diagram shown in FIG. 30 provides seven channels of "channel-off" logic. Thus in the embodiment being described, having the display format shown in FIG. 8, this completes the full 32 channels. Obviously additional or fewer channel-off's may be utilized and their position in the display may readily be changed by connection with the appropriate sequential gate pulse lines from the matrix. The purpose of the coupling network is to reduce the negative pulse amplitude to a level compatible with the operational amplifier 162. (A typical suitable operational amplifier is a type μA702.) The outputs of the coupling networks are connected in common to the inverting input of the amplifier.

The integrated circuit operational amplifier 162 sums and inverts the channel-off pulse inputs to produce positive pulses which turn on shunt transistor 160 and thus disable the beam-on pulse. This integrated circuit amplifier requires external frequency compensation to prevent oscillation and to increase bandwidth.

It is possible to increase the useful bandwidth of the type μA702 by about two octaves by connecting the 75 pf. capacitor 167 across the lead-lag frequency compensation terminals. This moves the open-loop frequency response to a much higher frequency.

Closed-loop gains of less than 40 db. require the addition of lag compensation. The gain of the circuit shown in FIG. 27 is about 0 db. In order to maintain the high slew rate required, the lag compensation is placed at a low-level point in the circuit. This is to decrease the signal rate-of-change across the compensation capacitor. Connecting the lag compensation network, composed of capacitor 168 and resistance 169, across the input increases the output voltage swing (and thus the slewing rate) at high frequencies. In addition the feedback resistor $R_f$ is kept small to decrease undesirable effects of stray capacitance shunting the feedback resistor. The compensation network (167, 168, and 169) increases the useful bandwidth of the type μA702 amplifier to beyond 10 MHz (as compared to 1 MHz for an uncompensated amplifier at 0 db. closed-loop gain). These same techniques may readily be applied to other conventional operational amplifiers.

Figure 28:
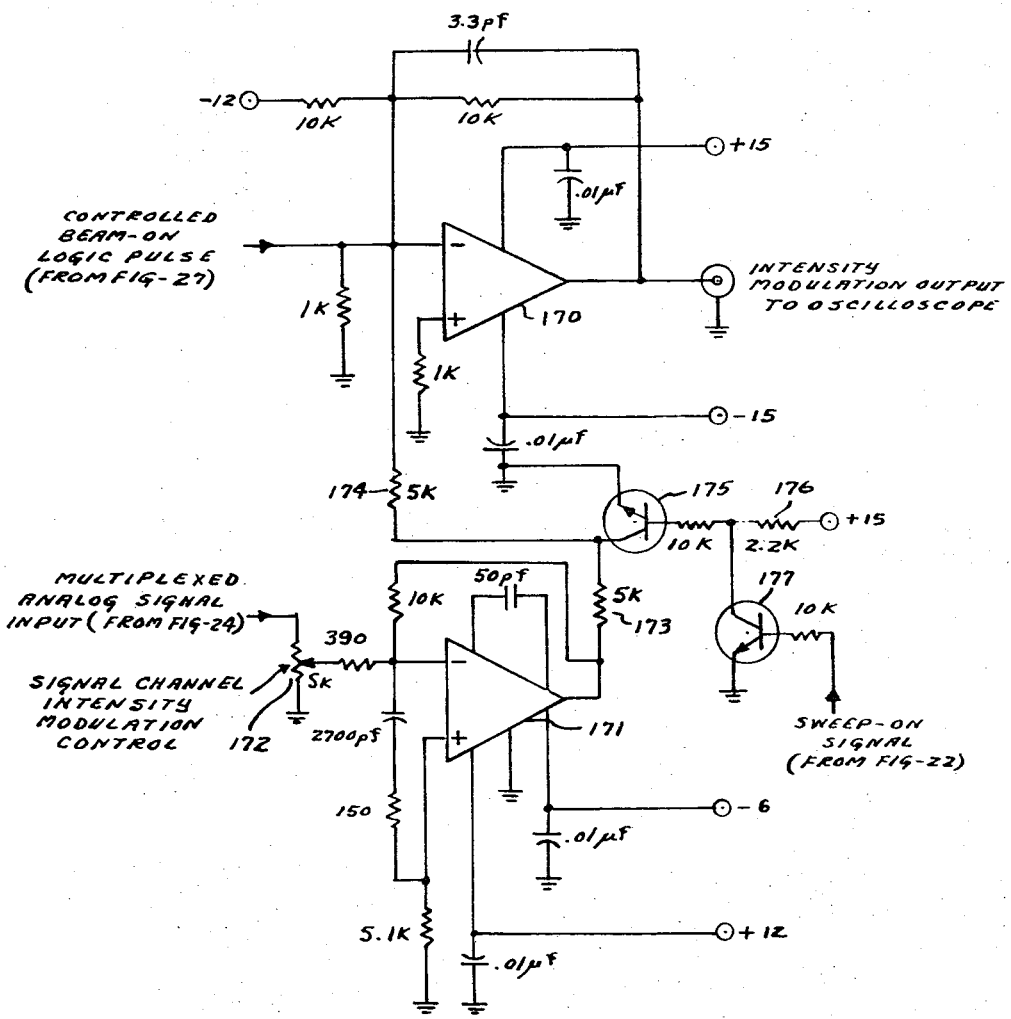
FIG. 28 is a schematic diagram of a beam-on pulse and analog signal summer providing the intensity modulation output circuit.

The function of the intensity modulation output circuit (Z-axis modulation), shown in FIG. 28, is to couple the appropriately synchronized and logically controlled beam-on pulse to the CRT cathode. In addition this circuit is used to modulate the Z-axis beam-on pulse with the multiplexed analog voltage from the sampling switches to produce individual channel intensity modulation.

Operational amplifier 170 in FIG. 28 inverts the controlled beam-on logic pulse to produce a negative 20-volt, 150-nsec. pulse which causes the electron beam to turn on for the pulse duration. When coupled with appropriate vertical and horizontal signals, this pulse causes the display to be produced.

Because the controlled beam-on logic pulses are driven by the same clock that controls the sample switch gate-on logic, the instantaneous analog multiplexed output modulates only the given beam-on pulse that corresponds in time to the same channel from which the instantaneous analog voltage was derived.

The multiplexed analog signal input represents a time-division and inverted composite analog signal. The signal channel intensity modulation control, shown in FIG. 28, controls the magnitude of the intensity modulation achieved. The conventional integrated circuit operational amplifier 171 inverts the multiplexed analog signal a second time. The output of the operational amplifier is summed with the controlled beam-on logic pulse by the operational amplifier 170 which is in the inverting summer configuration. Amplifier 170 inverts the positive-controlled beam-on logic pulse to produce the negative-going pulse required by the CRT cathode. Amplifier 170 also inverts the multiplexed analog signal a third time so that positive multiplexed analog voltages become negative voltages and therefore increase the instantaneous negative amplitude of the beam-on pulse to increase the instantaneous beam intensity. As a result, the positive-going portion of all analog channels displayed are increased in intensity. The magnitude of the intensity modulation depends on the setting of the signal channel intensity modulation control 172. All negative-going signal components are decreased in intensity and positive-going signal components are proportionately increased in intensity.

To prevent beam-on of the CRT by the intensity modulation signal derived from the multiplexed signal input in the absence of a horizontal sweep signal, the output of amplifier 171 must be disabled if no horizontal sweep of the CRT beam is taking place. Failure to disable the output of amplifier 171 can result in display artifacts during sweep-off conditions.

The positive 15-volt sweep-on signal (see FIG. 22) is used to control the output of amplifier 171 (in FIG. 28). Amplifier 171, shown in FIG. 28, is connected to the summing junction of amplifier 170, by resistances 173 and 174. If transistor 175 is saturated, the current through resistance 173 is shunted to ground and the output of amplifier 171 is disabled. In the circuit shown, transistor 175 is normally saturated due to positive base current supplied through resistance 176. However when a positive sweep-on signal at the base of transistor 177 causes it to fully conduct, the collector of transistor 177 approaches ground potential and the base potential of transistor 175 approaches zero. As a result transistor 175 becomes nonconductive and the output of operational amplifier 171 is not disabled.

GENERAL INFORMATION ON THE DISCLOSED EMBODIMENT

The input impedance of the signal channels is approximately 2K ohms. In many applications the signal to be displayed may have to be buffered to prevent loading of the signal source. Because a wide variety of signals can be displayed by the device, no universal input amplifier has been included for each of the signal channels as such amplifiers are well known. For example, electrocardiographic signals require differential input preamplifiers with a high degree of common-mode rejection while strain gauge transducers require an entirely different low-impedance type of input preamplifier.

Because the X, Y, and Z output signals of the display contain very fast rise-time components it is essential that shielded and appropriately terminated low-capacitance cables be used to connect the display to the oscilloscope as is well understood by those skilled in the art.

For purposes of comparison, the display provides for including a channel of the original unprocessed speech waveform (prime signal). The prime signal should be spaced some distance below the 24 output channels. This spacing is accomplished by placing five unused channels below the 24 analog signal channels. The prime signal channel is placed immediately below the five unused channels which are beamed off. The resulting basic display format for an analog ear is shown in FIG. 7.

A representative quasi three-dimensional display of the output of an analog ear is shown in FIG. 3. This Figure represents a 10-msec. glottal pulse from human speech. The glottal pulse was recorded as a one-shot transient using conventional Polaroid film. Film with an ASA equivalent speed of 3,000 has been found to be entirely adequate for photography of the display.

Display skew and individual channel intensity modulation are also shown in FIG. 3. The format corresponds to that shown in FIG. 7.

If individual channel input signals are used to modulate the CRT beam but are not summed with the staircase voltage, another type of display presentation can be realized. The display (shown in FIG. 9) then becomes a series of horizontal lines uniformly spaced vertically by the staircase voltage and intensity modulated by the signal present on the given signal channel. The display can be produced by removing the connection between the output of operational amplifier 135 and the inverting input of operational amplifier 136 by the opening of switch 137 shown in FIG. 24.

Using the basic principles outlined in this disclosure, it is possible to modify the number of channels in the display to achieve certain advantages. In this respect the maximum individual channel signal frequency $f_m$ can be increased at the expense of channel number. For example, if only a 15-channel display is required, the matrix logic can be converted to a basic 16-sequence system and the logic driver to a module 16 counter. As a result $f_m$ can be increased by a factor of two. With appropriate logic changes the number of channels could also be increased, but at the expense of a reduction in $f_m$ for all channels.

I claim:

1. An electronic system for receiving a plurality of channels of electrical signal information and providing input signals to the X, Y, and Z inputs of a conventional single-beam oscilloscope such that each channel is separately displayed on the oscilloscope and the display of the plurality of channels provides a quasi three-dimensional presentation of the received channelized signal information, the said electronic system comprising:

a. master clock means for providing a series of uniform timing pulses;

b. multiplexing means responsive to the master clock means and the plurality of channelized signals for providing a time-shared signal of uniform durations of each of the plurality of channelized analog signals;

c. staircase-voltage-generating means cooperating with the master clock means for providing a vertical channel displacement;

d. means cooperating with the multiplexing means and the staircase-voltage-generating means for adding the staircase voltages to the time-shared signal voltages and providing an input signal to the Y input of the oscilloscope;

e. beam control means cooperating with the master clock means for providing a control signal of less time duration than the said determined uniform signal durations, for eliminating switching transients and controlling the beam-on and beam-off conditions;

f. trigger means cooperating with the beam control means for synchronizing and initiating the display presentation;

g. sweep-generating means responsive to the said trigger means for generating a horizontal sweep voltage;

h. adding means responsive to the staircase voltage and the horizontal sweep voltage for providing a skewed relationship to the horizontal sweeps of the channelized presentation and an input signal to the X input of the oscilloscope; and i. voltage summing means responsive to the multiplexing means and the beam control means for providing an input signal to the Z input of the oscilloscope.

2. Apparatus for receiving a plurality of channels of analog signal information and providing horizontal, vertical, and intensity modulation, signals to the X, Y, and Z inputs, respectively, of a conventional single-beam oscilloscope whereby the said information is displayed on the oscilloscope in channelized quasi three-dimensional form, comprising:

a. master clock means for providing a series of uniformly timed pulses;

b. matrix means responsive to the said master clock means for providing a series of sequential gate pulses of determined length, the numerical number of gate pulses in the series being at least as large numerically as the said plurality of channels;

c. means responsive to the said matrix means and the said plurality of channels of analog signal information for selectively, sequentially, sampling the information signal on each of the plurality of channels and providing a time-shared signal representative of the plurality of analog signals;

d. staircase-voltage-generating means cooperating with the master clock means for providing a series of step increments of uniformly increasing voltage, the said series of step increments of voltage being of the same numerical number of steps as the said numerical number of gate pulses and the two said series being of the same time duration;

e. means responsive to the time-shared signal representative of the plurality of analog signals and the said staircase-voltage-generating means for adding respectively the respective staircase voltage with the respective corresponding time shared signal of sequentially sampled signal information and providing a composite vertical signal to the Y input of the oscilloscope;

f. means cooperating with the master clock means for providing a beam control signal for determining the aperture time of the beam, the said aperture time being of less time duration than the said determined gate pulse length;

g. means for generating a horizontal sweep voltage;

h. trigger means for providing internal and external control of the sweep-generating means;

i. means for adding the staircase voltage and the horizontal sweep voltage, and providing a horizontal input signal to the X input of the oscilloscope whereby the said plurality of channels of analog signal information is displayed in skewed relationship; and j. means responsive to the said sampling means and the said means for providing a beam control signal, for providing an intensity modulation signal to the Z input of the oscilloscope.

3. An electronic system for receiving a plurality of channels of analog signal information and providing horizontal, vertical, and intensity modulation signals to the respective X, Y, and Z inputs of a conventional single-beam triggered oscilloscope having a determined signal delay in the vertical channel, whereby the plurality of channels of analog signal information are displayed in skewed channelized form on the oscilloscope, comprising:

a. master clock means for providing a series of uniformly timed pulses;

b. matrix means responsive to the master clock means for providing a series of sequential gate pulses of determined length, the numerical number of gate pulses in the series being at least as large numerically as the said plurality of channels;

c. means responsive to the said matrix means and the said plurality of channels of analog signal information for selectively, sequentially, sampling the information signal on each of the plurality of channels and providing a time-shared signal representative of the plurality of analog signals;

d. staircase-voltage-generating means cooperating with the master clock means for providing a series of step increments of uniformly increasing voltage, the said series of step increments of voltage being of the same numerical number of steps as the said numerical number of gate pulses and in one-to-one correspondence therewith;

e. means responsive to the time-shared signal representative of the plurality of analog signals and the said staircase-voltage-generating means for adding the respective staircase voltage step with the respective corresponding time-shared signal of the sequentially sampled signal information and providing a composite vertical signal to the Y input of the triggered oscilloscope;

f. means cooperating with the master clock means for providing a beam control signal for determining the aperture time of the beam presentation, the said aperture time being of less time duration than the said determined gate pulse length;

g. means for generating a horizontal sweep voltage;

h. trigger means for providing an internal and external control of the sweep-generating means;

i. means including a delay line essentially equal in delay to the said determined signal delay in the vertical channel of the triggered oscilloscope, for adding the staircase voltage and the horizontal sweep voltage and providing a horizontal input signal to the X input of the oscilloscope whereby the said plurality of channels of analog signal information are displayed in skewed relationship; and j. means including a delay line essentially equal in delay to the said determined signal delay in the vertical channel of the triggered oscilloscope, responsive to the said sampling means and the said means for providing a beam control signal, for providing an intensity modulation signal to the Z input of the oscilloscope.

4. An electronic system for receiving a plurality of channels of analog signal information and providing horizontal, vertical, and intensity modulation signals to the respective X, Y, and Z inputs of a conventional single-beam triggered oscilloscope having a signal delay in the vertical channel, whereby the plurality of channels of analog signal information are displayed in skewed channelized form on the oscilloscope, comprising:

a. master clock means for providing a series of uniformly timed pulses;

b. matrix means responsive to the master clock means for providing a series of sequential gate pulses of determined length, the numerical number of gate pulses in the series being at least as large numerically as the said plurality of channels;

c. means responsive to the said matrix means and the said plurality of channels of analog signal information for selectively, sequentially, sampling the information signal on each of the plurality of channels and providing a time-shared signal representative of the plurality of analog signals;

d. staircase-voltage-generating means cooperating with the master clock means for providing a series of step increments of uniformly increasing voltage, the said series of step increments of voltage being of the same numerical number of steps as the said numerical number of gate pulses and in one-to-one correspondence therewith;

e. means responsive to the time-shared signal representative of the plurality of analog signals and the said staircase-voltage-generating means for adding the respective staircase voltage step with the respective corresponding time shared signal of the sequentially sampled signal information and providing a composite vertical signal to the Y input of the triggered oscilloscope;

f. means cooperating with the master clock means for providing a beam control signal for determining the aperture time of the beam presentation, the said aperture time being of less time duration than the said determined gate pulse length;

g. means for generating a horizontal sweep voltage;

h. trigger means for providing an internal and external control of the sweep-generating means;

i. means including a variable delay line of approximately 50 to 200 nanoseconds, for adding the staircase voltage and the horizontal sweep voltage and providing a horizontal input signal to the X input of the triggered oscilloscope whereby the said plurality of channels of analog signal information are displayed in skewed relationship; and j. means including a variable delay line of approximately 50 to 200 nanoseconds, responsive to said sampling means and the said means for providing a beam control signal, for providing an intensity modulation signal to the Z input of the triggered oscilloscope.

5. Apparatus for receiving a plurality of channels of analog signal information and providing horizontal, vertical, and intensity modulation signals to the respective X, Y, and Z inputs of a conventional single-beam oscilloscope, whereby the plurality of channels of analog signal information are displayed in skewed channelized form on the oscilloscope, comprising:

a. master clock means for providing a first series of uniformly timed pulses and a second series of uniformly timed pulses delayed from the first series;

b. matrix means responsive to the first series of uniformly timed pulses for providing a series of sequential gate pulses of determined length, the numerical number of gate pulses in the series being at least as large numerically as the said plurality of channels;

c. means responsive to the said matrix means and the said plurality of channels of analog signal information for selectively, sequentially, sampling the information signal on each of the plurality of channels and providing a time-shared signal representative of the plurality of analog signals;

d. staircase-voltage-generating means cooperating with the first series of pulses of the master clock means for providing a series of step increments of uniformly increasing voltage, the said series of step increments of voltage being of the same numerical number of steps as the said numerical number of gate pulses and in one-to-one correspondence therewith;

e. means responsive to the time-shared signal representative of the plurality of analog signals and the said staircase-voltage-generating means for adding the respective staircase voltage step with the respective corresponding time-shared signal of the sequentially sampled signal information and providing a composite vertical signal to the Y input of the oscilloscope;

f. means responsive to the said second series of pulses of the master clock means for providing a beam control signal for determining the aperture time of the beam, the said aperture time being of less time duration than the said determined gate pulse length;

g. means for generating a sweep voltage;

h. trigger means for providing an internal and an external control of the sweep-generating means;

i. means for adding variable magnitudes of the said staircase voltage and the said horizontal sweep voltage and providing an input signal to the X input of the oscilloscope whereby the said plurality of channels of analog signal information are displayed with variable amounts of horizontal skew in correspondence with the variable magnitudes of the staircase voltage; and j. means responsive to the said sampling means and the said means for providing a beam control signal, for providing an intensity modulation signal to the Z input of the oscilloscope for determining the "on" and "off" beam condition and modulating the intensity of the beam in the "on" condition responsive to the instantaneous analog signal being displayed.

6. The apparatus as claimed in claim 5 wherein the modulating of the beam in the "on" condition responsive to the instantaneous analog signal being displayed is manually adjustable in magnitude.